US012809786B2

(12) United States Patent
Bisheh Niasar et al.

(10) Patent No.: US 12,809,786 B2
(45) Date of Patent: Nov. 24, 2026

(54) MEMORY CONFLICT RESOLUTION FOR DILITHIUM CRYPTOGRAPHY

(71) Applicant: Microsoft Technology Licensing, LLC, Redmond, WA (US)

(72) Inventors: Mojtaba Bisheh Niasar, Dover, NH (US); Bharat S. Pillilli, El Dorado Hills, CA (US); Naga Kiranmayee Upadhyayula, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 97 days.

(21) Appl. No.: 18/654,513

(22) Filed: May 3, 2024

(65) Prior Publication Data

US 2026/0010490 A1 Jan. 8, 2026

(51) Int. Cl.

*G06F 12/14* (2006.01)
*G06F 12/06* (2006.01)
*H04L 9/30* (2006.01)

(52) U.S. Cl.

CPC ...... *G06F 12/1408* (2013.01); *G06F 12/0646* (2013.01); *H04L 9/3093* (2013.01); *G06F 2212/1052* (2013.01)

(58) Field of Classification Search

CPC ...... G06F 12/06; G06F 12/0646; G06F 12/14; G06F 12/1408; G06F 2212/1052; G06F 12/02; H04L 9/3093

See application file for complete search history.

(56) References Cited

U.S. PATENT DOCUMENTS 11,764,942 B2 * 9/2023 Liao ........................ H04L 9/008 713/168
12,058,261 B2 * 8/2024 Ghosh ................... H04L 9/0869
(Continued)

FOREIGN PATENT DOCUMENTS

EP 1801702 A1 * 6/2007 ........... G06F 13/385
WO WO-2020172234 A1 * 8/2020 ........... H04L 9/3093

OTHER PUBLICATIONS

H. El-Razouk and A. Reyhani-Masoleh, "New Bit-Level Serial GF (2m) Multiplication Using Polynomial Basis," 2015 IEEE 22nd Symposium on Computer Arithmetic, Lyon, France, 2015, pp. 129-136.*

(Continued)

*Primary Examiner* — Pierre Michel Bataille
(74) *Attorney, Agent, or Firm* — Schwegman Lundberg & Woessner, P.A.

(57) ABSTRACT

Generally discussed herein are devices, systems, and methods for performing a number theoretic transform (NTT)/inverse NTT (INTT). A circuit for NTT/INTT can include a memory configured to store polynomial coefficients, butterfly operator circuits coupled to receive the polynomial coefficients and generate, after iterations of operating on the polynomial coefficients, transformed coefficients as outputs, a first subset of the butterfly operator circuits situated in series with each other and in parallel with a second subset of the butterfly operator circuits, shift registers coupled between the butterfly operator circuits and the memory, and a controller coupled to the memory, the controller configured to control which coefficients are provided to the butterfly operator circuits and which addresses of the memory store the outputs.

19 Claims, 11 Drawing Sheets

(56) References Cited

U.S. PATENT DOCUMENTS

| | | | | |
|---|---|---|---|---|
| 2018/0005059 | A1* | 1/2018 | Chang | G06V 10/955 |
| 2022/0385447 | A1* | 12/2022 | Liao | H04L 9/008 |
| 2023/0163945 | A1* | 5/2023 | Park | H04L 9/0618<br>713/168 |
| 2023/0171084 | A1* | 6/2023 | Kwon | H04L 9/3093<br>380/28 |
| 2023/0318829 | A1* | 10/2023 | Sim | H04L 9/3093 |
| 2024/0411833 | A1* | 12/2024 | Bisheh Niasar | G06F 7/50 |
| 2025/0007688 | A1* | 1/2025 | Kumar | H04L 9/008 |
| 2025/0217439 | A1* | 7/2025 | Yang | G06F 17/142 |
| 2025/0245144 | A1* | 7/2025 | Park | G06F 12/0238 |
| 2025/0245285 | A1* | 7/2025 | Park | G06F 17/11 |

OTHER PUBLICATIONS

Bingxin Liu and Huapeng Wu, “Efficient architecture and implementation for NTRUEncrypt system,” 2015 IEEE 58th International Midwest Symposium on Circuits and Systems (MWSCAS), Fort Collins, CO, 2015, pp. 1-4.*

* cited by examiner

MEMORY CONFLICT RESOLUTION FOR DILITHIUM CRYPTOGRAPHY

BACKGROUND

The advent of quantum computers poses a serious challenge to the security of the existing public-key cryptosystems, as they can be potentially broken based on Shor's algorithm. Lattice-based cryptosystems are among the most promising post-quantum cryptography (PQC) algorithms that are believed to be hard for both classical and quantum computers to break.

Number Theoretic Transform (NTT) and Inverse Number Theoretic Transform (INTT) are used to achieve more efficient polynomial multiplication in lattice-based cryptosystems by reducing time-complexity from $O(n^2)$ to $O(n \log n)$.

SUMMARY

A method, device, system, or a machine-readable medium for number theoretic transform (NTT) and inverse NTT (INTT) are provided. The NTT and INTT operations improve upon prior NTT and INTT operations by getting rid of a need to shuffle intermediate coefficients in memory between operations of the butterfly operator circuits. The NTT and INTT operations achieve this by specifically controlling which addresses are read or written to, along with a customized buffer that stores outputs from or inputs to butterfly operator circuits, so that the entries are ready for a next iteration of NTT/INTT performance.

A circuit can include a memory configured to store polynomial coefficients. The circuit can include butterfly operator circuits coupled to receive the polynomial coefficients and generate, after iterations of operating on the polynomial coefficients, transformed coefficients as outputs, a first subset of the butterfly operator circuits situated in series with each other and in parallel with a second subset of the butterfly operator circuits. The circuit can include shift registers coupled between the butterfly operator circuits and the memory. The circuit can include a controller coupled to the memory, the controller configured to control which coefficients are provided to the butterfly operator circuits and which addresses of the memory store the outputs.

The controller can be configured to (i) either read from or write to the memory addresses in sequential order and (ii) write to or read from the memory addresses in a non-sequential order. The non-sequential order can include, in each two stages of NTT or INTT, writing to or reading from every sixteenth address modulo sixty-four until an address is repeated.

The circuit can be configured to perform NTT. In such a configuration, the shift registers are situated to receive the polynomial coefficients. In such a configuration, the controller is configured to read from the memory addresses in non-sequential order and write to the memory addresses in sequential order.

The circuit can be configured to perform INTT. In such a configuration, the shift registers can be situated to receive the outputs of the butterfly operator circuits. In such a configuration, the controller is configured to read from the memory addresses in sequential order and write to the memory addresses in non-sequential order.

A modular multiplier of each of the butterfly operator circuits can be configured, after performing NTT, to multiply polynomial coefficients in NTT domain. The shift registers can include first, second, third, and fourth shift registers situated to respective output coefficients. Each of the first, second, third, and fourth shift registers can each have a different depth. The depth of the first, second, third, and fourth shift registers can be four, five, six, and seven, respectively. A first multiplexer can be configured to provide, based on a select control of the first multiplexer, contents of the first, second, third, and fourth shift registers in consecutive, respective clock cycles.

A device, machine-readable medium, system, or method can be configured to implement the functionality of the circuit.

DETAILED DESCRIPTION

Figure 1:
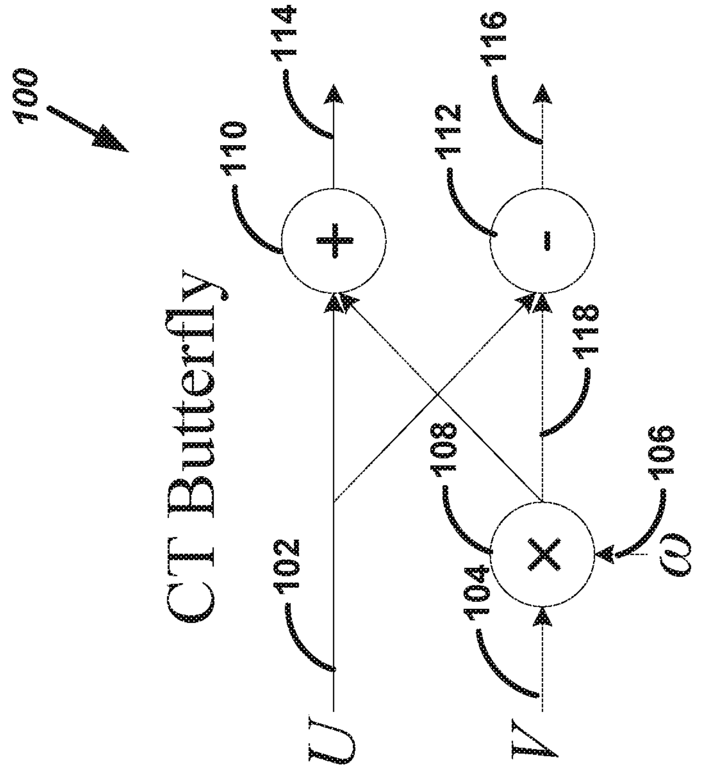
FIG. 1 illustrates, by way of example, a conceptual circuit diagram of an embodiment of a CT butterfly operator circuit.

In the following description, reference is made to the accompanying drawings that form a part hereof, and in which is shown by way of illustration specific embodiments which may be practiced. These embodiments are described in sufficient detail to enable those skilled in the art to practice the embodiments. It is to be understood that other embodiments may be utilized and that structural, logical, and/or electrical changes may be made without departing from the scope of the embodiments. The following description of embodiments is, therefore, not to be taken in a limited sense, and the scope of the embodiments is defined by the appended claims.

Cloud computing has become an integral part of modern society, offering various services and applications to individuals and organizations. The security of cloud computing is threatened by the advent of quantum computers, which can potentially break the existing public-key cryptosystems, such as Rivest-Shamir-Adleman (RSA) and Elliptic Curve Cryptography (ECC) based on Shor's algorithm. Shor's algorithm is a quantum computer algorithm for finding the prime factors of an integer. Current public-key cryptography is not presently threatened by modern quantum computers. However, cloud resource managers should anticipate the challenge quantum computers pose to modern cryptography and initiate a transition to a postquantum era in a timely manner. In fact, the U.S. government issued a National Security Memorandum in May 2022 that mandated federal agencies to migrate to post-quantum cryptosystems (PQC) by 2035 to mitigate risks to vulnerable cryptographic systems.

A long-term security of cloud computing against quantum attacks can benefit from developing lattice-based cryptosystems, which are among the most promising PQC algorithms that are believed to be hard for both classical and quantum computers. Lattice-based cryptosystems are among the most promising PQC algorithms that are believed to be hard for both classical and quantum computers. Number theoretic transform (NTT) and inverse NTT (INTT) can be used to achieve more efficient polynomial multiplication in lattice-based cryptosystems. NTT and INTT help reduce algorithm complexity from $O(n^2)$ to O(n log n). The complexity of the NTT and INTT computation can benefit from improvement in terms of efficiency so as to help improve operation of the lattice-based cryptosystems.

Circuit architectures resolve a memory access conflict in performing NTT and INTT are provided. The architectures address challenges associated with utilizing a merged NTT/INTT architecture on hardware platforms. The circuit architectures address the complexities related to memory bandwidth and performance bottlenecks. The overall structure of the architecture, including buffers of differing sizes, control circuitry that strategically writes results to memory, or a combination thereof, help address the memory access conflicts.

NTT and INTT operations can be accomplished iteratively. NTT and INTT can be performed by applying a sequence of "butterfly operations" on the input polynomial coefficients. Butterfly operations are arithmetic operations that combine two coefficients of polynomials to obtain two outputs. The NTT and INTT operations can be computed in a logarithmic number of steps using repeated butterfly operations.

Figure 2:
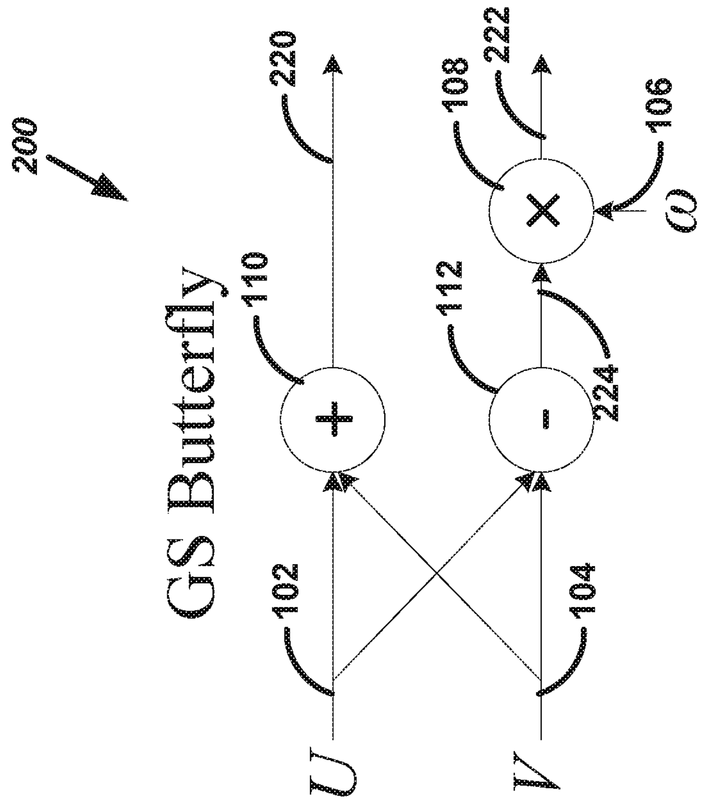
FIG. 2 illustrates, by way of example, a conceptual circuit diagram of an embodiment of a GS butterfly operator circuit.

In embodiments, Cooley-Tukey (CT) and Gentleman-Sande (GS) butterfly configurations can be used to facilitate NTT/INTT computation. A commonly required bit-reverse function reverses the bits of the coefficient index. However, the bit-reverse permutation can be skipped by using CT butterfly operations for NTT and GS butterfly operations for INTT. FIGS. 1 and 2 illustrate a CT butterfly operator and the GS butterfly operator, respectively. More details regarding NTT/INTT and lattice-based computation of NTT/INTT are provided elsewhere herein.

FIG. 1 illustrates, by way of example, a conceptual circuit diagram of an embodiment of a CT butterfly operator circuit 100. The circuit 100 performs the CT butterfly operations. The circuit 100 takes, as input U 102 and V 104, which are coefficients of respective polynomials, and ω 106, which is a weight. V 104 and ω 106 are modular multiplied (V*ω mod q) using a modular multiplier 108. A result 118 of the multiplication performed by the multiplier 108 and U 102 are added using a modular adder 110 to generate a first output coefficient 114. The result 118 and U 102 are subtracted using a modular subtractor 112 to generate a second output coefficient 116. The first and second output coefficients 114 and 116 can then be used as inputs, U and V, respectively, in a next iteration of circuit 100 operation.

Pseudocode for an iterative NTT operation using the CT butterfly operator circuit 100 is provided:

```
In-Place NTT Algorithm using CT Butterfly Operator Circuit
Require: a(x) ∈ R_q, ω_n ∈ ℤ_q, n = 2^l
Ensure: â(x) = NTT (a) ∈ R_q
    â ← bit − reverse(a)
    for i from 1 to l do
        m = 2^(l−i)
        for j from 0 to 2^(i−1) − 1 do
            W ← ω_n^(1+j)
            for k from 0 to m − 1 do
                U ← â[2jm + k]
                V ← â[2jm + k + m] mod q
                T ← V · W
                â[2jm + k] = U + T mod q
                â[2jm + k + m] = U − T mod q
            end for
        end for
    end for
    return â(x) ∈ R_q
```

where a is a polynomial and w is a twiddle factor, and n is a number of coefficients in the polynomial.

FIG. 2 illustrates, by way of example, a conceptual circuit diagram of an embodiment of a GS butterfly operator circuit 200. The circuit 200 performs the mathematical operations the GS butterfly operation. The circuit 200 takes, as input U 102, V 104, and ω 106. U and V are added mod q, by modular adder 110, resulting in a first output coefficient 220. U 102 and V 104 are subtracted mod q, by modular subtractor 112, resulting in result 224. The result 224 is then multiplied by a weight, ω 106, using a modular multiplier 108. A result of the multiplication performed by the multiplier 108 is a second output coefficient 222. The first and second output coefficients 220 and 222 can then be used as inputs in a next iteration of circuit 200 operation.

What follows is a description of NTT/INTT. Let q be a prime number and $Z_q$ be the ring of integers modulo q. Define the ring of polynomials for some integer N as $R_q=Z_q[X]/(X^N+1)$, where the polynomials have n coefficients, each modulo q. Regular font lowercase letters (a) represent single polynomials, bold lowercase letters (a) represent polynomial vectors, and bold uppercase letters (A) to represent a matrix of polynomials. Representations in the NTT domain are represented by (â), (â) and (Â), respectively. Let a and b be polynomial vectors in $R_q$. Let $a \circ b \in R_q$ denote coefficient-wise multiplication of polynomials. The ∘ product of a matrix and a vector is the natural extension of coefficient-wise multiplication of the polynomial vectors.

A naive method of polynomial multiplication has $O(n^2)$ complexity. This complexity can be reduced by using NTT. To multiply two polynomials efficiently in lattice-based cryptography, the polynomial rings of the form $R_q=Z_q[X]/(X_N+1)$ can be used, where $(X^N+1)$ enables fast polynomial division. The NTT transform maps polynomials to the NTT domain at the cost of O(n*log n) where multiplying their coefficients results in a polynomial that corresponds to the product of the original polynomials modulo q and $(X^N+1)$. Coefficient-wise multiplication has a complexity of $O(n)$. A total time complexity is thus O(n·log n).

The NTT is a generalization of a fast Fourier transform (FFT) defined in a finite field. Suppose $f$ is a polynomial of degree n with coefficients in $Z_q$, as:

$$f = \sum_{i=0}^{n-1} f_i X^i$$

FFT uses the twiddle factor $\omega_n$ n-th root of unity of form $e^{2\pi h/n}$, while NTT has $\omega_n \in Z_q$ such that on be a primitive n-th root of unity modulo q, i.e.

$$\omega_n^n = 1 \bmod q.$$

The NTT transforms $f$, i.e., $\hat{f}$=NTT($f$), is computed as follows for each i∈€ {0, 1, . . . , n−1}:

$$\hat{f}_i = \sum_{j=0}^{n-1} f_j \omega_n^{ij}$$

The INTT recovers $f$ from $\hat{f}$ as:

$$f_i = \sum_{j=0}^{n-1} \hat{f}_j \omega_n^{-ij}$$

Hence, the multiplication between two polynomials $f$ and g using NTT can be performed as:

$$f \cdot g = INTT(NTT(f) \circ NTT(g))$$

NTT algorithm is shown in pseudocode elsewhere herein.

Figure 3:
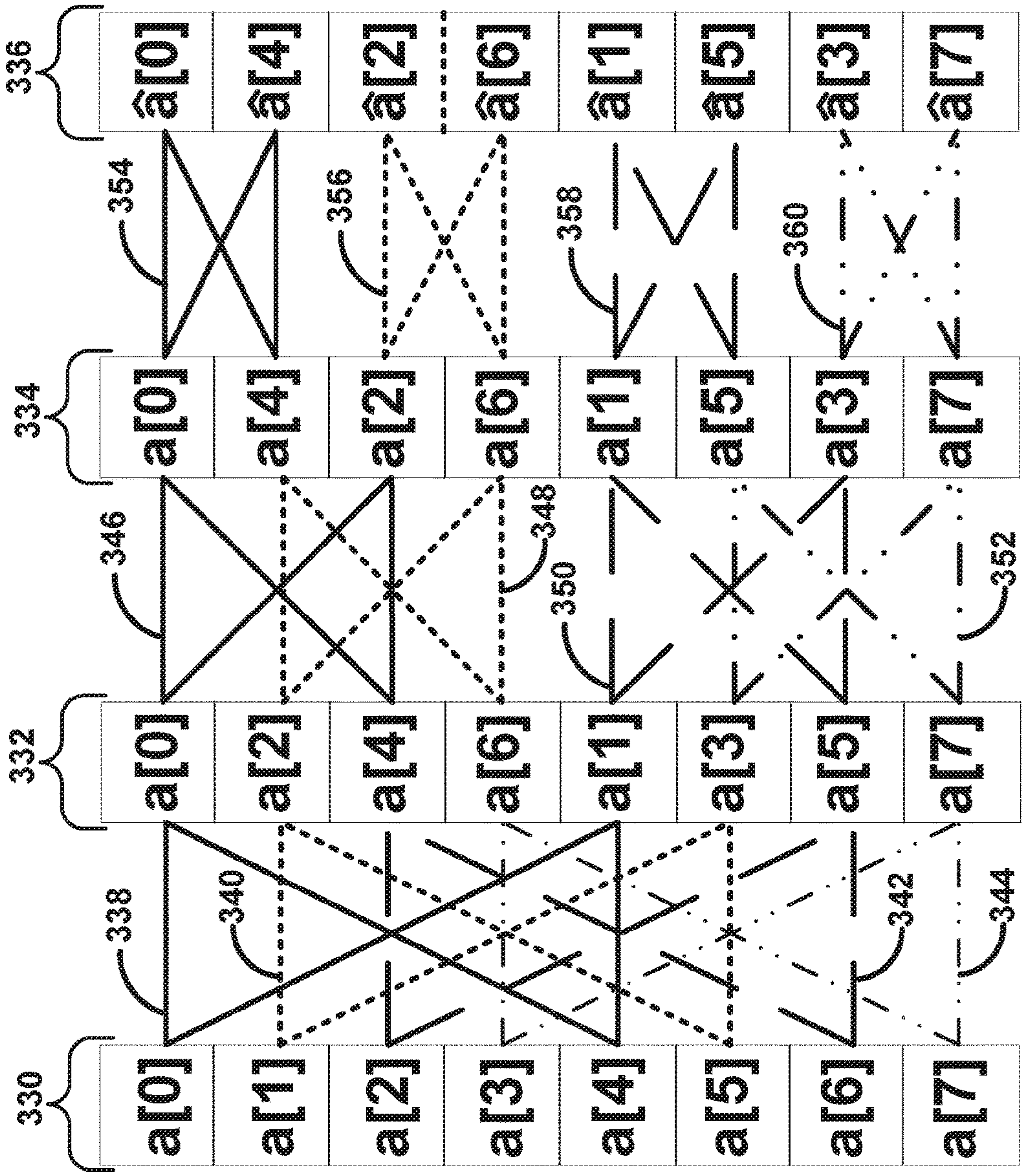
FIG. 3 illustrates, by way of example, a diagram of an embodiment of a data flow for an NTT computation of an 8-coefficient polynomial using CT butterfly operations.

FIG. 3 illustrates, by way of example, a diagram of an embodiment of a data flow for an NTT computation of an 8-coefficient polynomial using CT butterfly operations. At a first stage 330, 8 coefficients are provided, not necessarily all at the same time. The eight coefficients are a[0], a[1], a[2], a[3], a[4], a[5], a[6], a[7]. A few techniques to perform NTT or INTT on the eight coefficients to generate eight converted coefficients â[0], â[1], â[2], â[3], â[4], â[5], â[6], â[7] include:

(i) using a single butterfly circuit 100 or 200 to perform each of the operations 338, 340, 342, 344, 346, 348, 350, 352, 354, 356, 358, 360 in sequential order and storing the results of each the operations 338, 340, 342, 344, 346, 348, 350, 352, 354, 356, 358, 360 that are needed as they are generated and needed for future calculations;

(ii) using a single butterfly circuit 100 or 200 in a pipelined fashion to determine â[0] and â[4] by performing operations 338, 342, 346, 348, and 354, then determining â[2] and â[6] by performing operations 340, 344, 348 and 356 and using results from performing operation 346 previously, then determining â[1] and â[5] by using results from performing operations 338 and 342 and the performing operations 350, 352, and 358, then determining â[3] and â[7] by using the results from performing operations 340, 344, 350, and 352 and the performing operation 360;

(iii) using a parallelized architecture that utilizes n/2 butterfly circuits 100 or 200 situated in parallel to simultaneously perform operations 338, 340, 342, 344 in parallel, then perform operations 346, 348, 350, 352 in parallel, then perform operations 354, 356, 358, 360 in parallel.

The single butterfly circuit 100 or 200 operating in sequence (technique (i)) requires, for a 256 coefficient polynomial 8 rounds of butterfly operations with 128 butterfly operation per round. Each butterfly operation requires three clock cycles per butterfly operation, one cycle to read data, one cycle for the butterfly operator circuit operation, and one cycle to write the data. Converting the 256 coefficient polynomial in these conditions thus requires 3072 clock cycles.

For technique (ii), increasing the depth of butterfly circuits increases an amount of die area overhead due to the data dependency between stages 332, 334, 336. For technique (iii), increasing the number of butterfly circuits increases die area and memory access overhead. The memory access overhead comes from writing all results from the operations 338, 340, 342, 344 before having the ability to perform the operations 346, 348, 350, 352. The memory access latency of the technique (iii) and the die area consumed by the technique (iii) are unnecessarily high.

A merged-layer NTT technique uses two pipelined stages with two butterfly operator circuits in each stage level, making 4 butterfly operator circuits in total. The parallel pipelined butterfly operator circuits enable one to perform radix-4 NTT/INTT operations with four parallel coefficients.

However, performing NTT using two pipelined stages and two butterfly operator circuits, a specific memory pattern limits the efficiency of the operations of the butterfly operator circuits. For a Dilithium cryptography use case, there are n=256 coefficients per polynomial that requires log n=8 layers of NTT operations. Each butterfly unit takes two coefficients for which a difference between the indexes is $2^{8-i}$ in an $i^{th}$ stage of processing. That means for each stage, the given indexes for each butterfly operator circuit are as follows:

Stage 1 input indexes: {(0, 128), {1, 129), (2, 130), . . . , (127, 255)}
Stage 2 input indexes: {(0, 64), {1, 65), (2, 66), . . . , (63, 127), (128, 192), (129, 193), . . . , (191, 255)}
. . .
Stage 8 input indexes: {(0, 1), {2, 3), (4, 5), . . . , (254, 255)}

There are several considerations for accessing these indices:

(i) There are 4 coefficients per cycle to match the throughput into 2×2 butterfly units.

(ii) An optimized architecture can include a memory with just one reading port, and one writing port.

(iii) Based on (i) and (ii), each memory address can include 4 coefficients.

(iv) The initial coefficients can be produced sequentially by a Keccak hash function and samplers. Specifically, they begin with coefficient 0 and continue incrementally up to coefficient 255. Hence, at the very beginning cycle, the memory contains (0, 1, 2, 3) in the first address, (4, 5, 6, 7) in second address, and so on.

(v) The cost of in-place memory relocation to align the memory content is not negligible. Particularly, it needs to be repeated for each stage.

While memory bandwidth limits the efficiency of the butterfly operator circuits, a specific memory pattern can be used to store four coefficients per address. A circuit architecture that resolves memory conflicts includes a pipeline architecture that reads and writes memory in particular patterns and using a set of differing sized buffers, the corresponding coefficients are fed into an NTT calculator.

Figure 4:
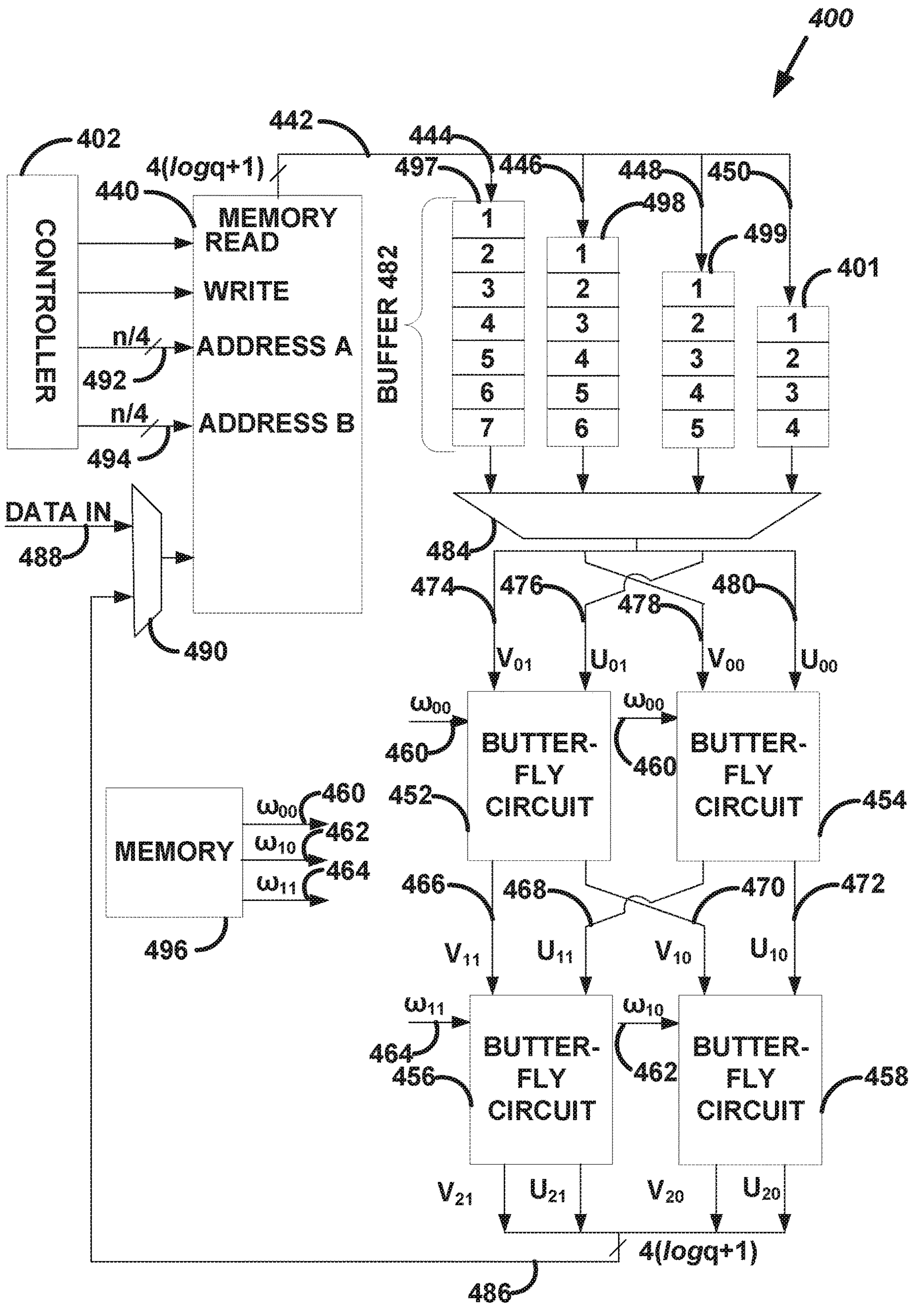
FIG. 4 illustrates, by way of example, a diagram of an embodiment of a circuit that improves time latency in performing NTT conversions.

FIG. 4 illustrates, by way of example, a diagram of an embodiment of a circuit 400 that improves time latency in performing NTT conversions. The circuit 400 as illustrated includes a memory 440 that provides coefficients and intermediate NTT conversion values 444, 446, 448, 450 (jointly coefficient or intermediate results 442) to buffer 482, which is comprised of shift registers 401, 497, 498, 499. Entries can be read from the buffer 482 and provided to a multiplexer 484 which provide the entries to butterfly operator circuits 452, 454. What follows is a description of how the controller 402 populates the buffer 482 by reading the coefficients from the memory 440 in a specific order. Then the operation of the remainder of the circuit 400 is provided.

A controller 402 determines an order of reading from the memory 440. For 256 coefficients the following inputs are used by the butterfly operator circuits 452, 454, 456, 458:

Stage 1 input indexes: {(0, 128), {1, 129), (2, 130), . . . , (127, 255)}
Stage 2 input indexes: {(0, 64), {1, 65), (2, 66), . . . , (63, 127), (128, 192), (129, 193), . . . , (191, 255)}
. . .
Stage 8 input indexes: {(0, 1), {2, 3), (4, 5), . . . , (254, 255)}

The controller 402 populates the memory 440 with four coefficients in each address (sometimes called an entry) and in order. Thus, the memory 440, after processing all the data in 488 would be populated as follows:

| ADDRESS | INITIAL MEMORY CONTENT | | | |
|---|---|---|---|---|
| 0 | 0 | 1 | 2 | 3 |
| 1 | 4 | 5 | 6 | 7 |
| 2 | 8 | 9 | 10 | 11 |
| 3 | 12 | 13 | 14 | 15 |
| 4 | 16 | 17 | 18 | 19 |
| 5 | 20 | 21 | 22 | 23 |
| 6 | 24 | 25 | 26 | 27 |
| 7 | 28 | 29 | 30 | 31 |
| 8 | 32 | 33 | 34 | 35 |
| 9 | 36 | 37 | 38 | 39 |
| 10 | 40 | 41 | 42 | 43 |
| 11 | 44 | 45 | 46 | 47 |
| 12 | 48 | 49 | 50 | 51 |
| 13 | 52 | 53 | 54 | 55 |
| 14 | 56 | 57 | 58 | 59 |
| 15 | 60 | 61 | 62 | 63 |
| 16 | 64 | 65 | 66 | 67 |
| 17 | 68 | 69 | 70 | 71 |
| 18 | 72 | 73 | 74 | 75 |
| 19 | 76 | 77 | 78 | 79 |
| 20 | 80 | 81 | 82 | 83 |
| 21 | 84 | 85 | 86 | 87 |
| 22 | 88 | 89 | 90 | 91 |
| 23 | 92 | 93 | 94 | 95 |
| 24 | 96 | 97 | 98 | 99 |
| 25 | 100 | 101 | 102 | 103 |
| 26 | 104 | 105 | 106 | 107 |
| 27 | 108 | 109 | 110 | 111 |
| 28 | 112 | 113 | 114 | 115 |
| 29 | 116 | 117 | 118 | 119 |
| 30 | 120 | 121 | 122 | 123 |
| 31 | 124 | 125 | 126 | 127 |
| 32 | 128 | 129 | 130 | 131 |
| 33 | 132 | 133 | 134 | 135 |
| 34 | 136 | 137 | 138 | 139 |
| 35 | 140 | 141 | 142 | 143 |
| 36 | 144 | 145 | 146 | 147 |
| 37 | 148 | 149 | 150 | 151 |
| 38 | 152 | 153 | 154 | 155 |
| 39 | 156 | 157 | 158 | 159 |
| 40 | 160 | 161 | 162 | 163 |
| 41 | 164 | 165 | 166 | 167 |
| 42 | 168 | 169 | 170 | 171 |
| 43 | 172 | 173 | 174 | 175 |
| 44 | 176 | 177 | 178 | 179 |
| 45 | 180 | 181 | 182 | 183 |
| 46 | 184 | 185 | 186 | 187 |
| 47 | 188 | 189 | 190 | 191 |
| 48 | 192 | 193 | 194 | 195 |
| 49 | 196 | 197 | 198 | 199 |
| 50 | 200 | 201 | 202 | 203 |
| 51 | 204 | 205 | 206 | 207 |
| 52 | 208 | 209 | 210 | 211 |
| 53 | 212 | 213 | 214 | 215 |
| 54 | 216 | 217 | 218 | 219 |
| 55 | 220 | 221 | 222 | 223 |
| 56 | 224 | 225 | 226 | 227 |
| 57 | 228 | 229 | 230 | 231 |
| 58 | 232 | 233 | 234 | 235 |
| 59 | 236 | 237 | 238 | 239 |
| 60 | 240 | 241 | 242 | 243 |
| 61 | 244 | 245 | 246 | 247 |
| 62 | 248 | 249 | 250 | 251 |
| 63 | 252 | 253 | 254 | 255 |

Memory 440 Content After Initialization

The controller 402 can read from the memory 440 in a manner that provides the coefficients to the buffer 482 and ultimately the butterfly operator circuits 452, 454 in the order that matches the needed input indexes. The addresses for efficiently performing NTT using the circuit 400 can be read in accord with the following pseudocode:

```
1: Address = 0
2: Read from Address
3: Address = (Address + 16) mod 64
4: If Address = 63
     Read from Address
     End
   Else GoTo 2:
```

The values 444, 446, 448, 450 can be stored in the buffer 482 in an order that is conducive for operating on by the butterfly operator circuits 452, 454. The order is indicated by Arabic numerals in the buffer 482. At each new output of the butterfly circuits 456, 458 a new value can be stored in each shift register 497, 498, 499, 401 and each value currently stored in the shift register can be shifted to an entry associated with an immediately higher Arabic numeral.

The shift registers 497, 498, 499, 401 can be configured in a serial-in, parallel-out manner. Each of the shift registers 497, 498, 499, 401 can have different depths. The depth is the number of values that can be stored in the shift register 497, 498, 499, 401. The depths of the shift registers 401, 499, 498, 497 can be 4, 5, 6, and 7, respectively. After four values 450 are received from the memory 440, the shift register 401 is full and four values can be read in parallel therefrom. The values from the shift register 401 can then be provided to the butterfly operator circuits 452, 454 in a single clock cycle. After five values 448 are received from the memory 440, the shift register 499 is full. The four oldest values in the shift register 499 (those occupying entries 2-5) can then be read in parallel therefrom. The values read from the shift register 499 can then be provided to the butterfly operator circuits 452, 454 in a single clock cycle (after being selected by the multiplexer 484). After six output values 446 are received from the butterfly circuit 458, the shift register 498 is full. The four oldest values in the shift register 498 (those occupying entries 3-6) can then be read in parallel therefrom. The values read from the shift register 498 can then be provided to the butterfly operator circuit 452, 454 in a single clock cycle (after being selected by the multiplexer 484). After seven values 444 are received from the memory 440, the shift register 497 is full. The four oldest values in the shift register 497 (those occupying entries 4-7) can then be read in parallel therefrom. The values read from the shift register 497 can then be provided to the butterfly operator circuits 452, 454 in a single clock cycle (after being selected by the multiplexer 484).

Using this reading scheme, the addresses are read as follows: 0, 16, 32, 48, 1, 17, 33, 49, . . . , 15, 31, 47, 63.

Figure 5:
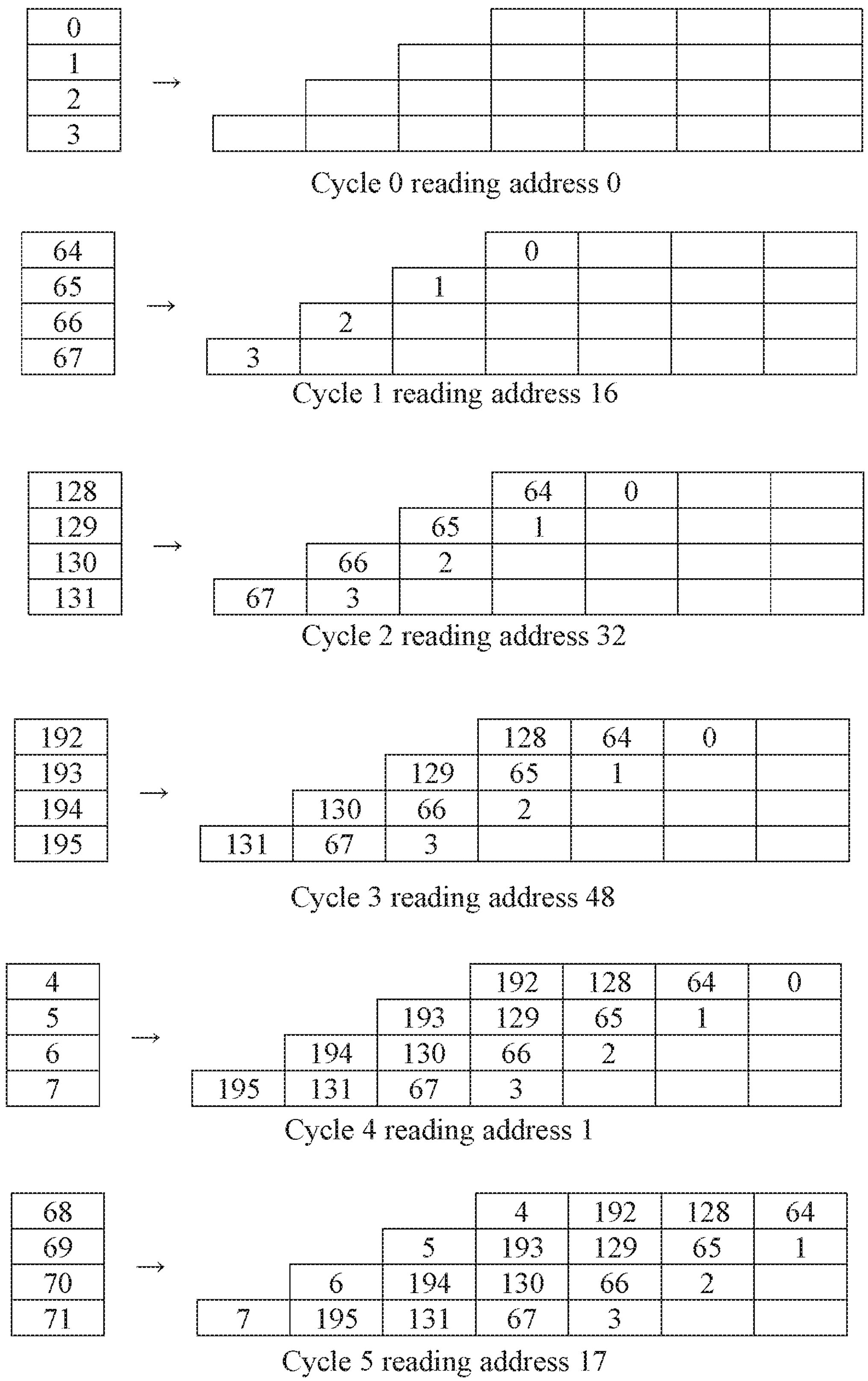
FIG. 5 illustrates, by way of example, a diagram of an embodiment of writing data to shift registers in performing NTT conversions in stages 1 and 2.

The contents of the shift registers 401, 499, 498, and 497 are coefficients, not addresses, using this reading scheme are provided with the shift register 401 having depth 4, shift register 499 having depth 5, shift register 498 having depth 6, and shift register 499 having depth 7, as illustrated in FIG. 5.

The shift register 401, after four writes, includes the coefficients for the butterfly circuits 452, 454, namely coefficients (0, 128) and (64, 192). Since the first and second stages of NTT operation are merged using the circuit 400, the output 466, 468, 470, 472 of the first parallel butterfly circuits 452, 454 provide input for the second parallel set of butterfly circuits 456, 458 i.e., (0, 64) and (128, 192) in the example of the first cycle of butterfly circuit operation and 256 coefficients. The resulting intermediate coefficients {0, 64, 128, 192} are then written, under control of the controller 402, to the memory 440 at address 0.

Since the controller 402 already read from address 0, there is no conflict with writing the data back to address 0 after the first results from the butterfly operator circuits 452, 454, 456, 458 are received. The controller 402 can continue to read from the memory 440 by incrementing the address by 16 modulo 64 and writing results from the butterfly operator circuits 452, 454, 456, 458 incrementally until the memory is full (or equivalently until the butterfly operator circuits 452, 454, 456, 458 have provided 256 coefficients that correspond to the first two stages of NTT coefficient generation).

The contents of the memory 440 after writing coefficients for stages 1 and 2 are:

| Address | Memory Content after stages 1 and 2 | | | |
|---|---|---|---|---|
| 0 | 0 | 64 | 128 | 192 |
| 1 | 1 | 65 | 129 | 193 |
| 2 | 2 | 66 | 130 | 194 |
| 3 | 3 | 67 | 131 | 195 |
| 4 | 4 | 68 | 132 | 196 |
| 5 | 5 | 69 | 133 | 197 |
| 6 | 6 | 70 | 134 | 198 |
| 7 | 7 | 71 | 135 | 199 |
| 8 | 8 | 72 | 136 | 200 |
| 9 | 9 | 73 | 137 | 201 |
| 10 | 10 | 74 | 138 | 202 |
| 11 | 11 | 75 | 139 | 203 |
| 12 | 12 | 76 | 140 | 204 |
| 13 | 13 | 77 | 141 | 205 |
| 14 | 14 | 78 | 142 | 206 |
| 15 | 15 | 79 | 143 | 207 |
| 16 | 16 | 80 | 144 | 208 |
| 17 | 17 | 81 | 145 | 209 |
| 18 | 18 | 82 | 146 | 210 |
| 19 | 19 | 83 | 147 | 211 |
| 20 | 20 | 84 | 148 | 212 |
| 21 | 21 | 85 | 149 | 213 |
| 22 | 22 | 86 | 150 | 214 |
| 23 | 23 | 87 | 151 | 215 |
| 24 | 24 | 88 | 152 | 216 |
| 25 | 25 | 89 | 153 | 217 |
| 26 | 26 | 90 | 154 | 218 |
| 27 | 27 | 91 | 155 | 219 |
| 28 | 28 | 92 | 156 | 220 |
| 29 | 29 | 93 | 157 | 221 |
| 30 | 30 | 94 | 158 | 222 |
| 31 | 31 | 95 | 159 | 223 |
| 32 | 32 | 96 | 160 | 224 |
| 33 | 33 | 97 | 161 | 225 |
| 34 | 34 | 98 | 162 | 226 |
| 35 | 35 | 99 | 163 | 227 |
| 36 | 36 | 100 | 164 | 228 |
| 37 | 37 | 101 | 165 | 229 |
| 38 | 38 | 102 | 166 | 230 |
| 39 | 39 | 103 | 167 | 231 |
| 40 | 40 | 104 | 168 | 232 |
| 41 | 41 | 105 | 169 | 233 |
| 42 | 42 | 106 | 170 | 234 |
| 43 | 43 | 107 | 171 | 235 |
| 44 | 44 | 108 | 172 | 236 |
| 45 | 45 | 109 | 173 | 237 |
| 46 | 46 | 110 | 174 | 238 |
| 47 | 47 | 111 | 175 | 239 |
| 48 | 48 | 112 | 176 | 240 |
| 49 | 49 | 113 | 177 | 241 |
| 50 | 50 | 114 | 178 | 242 |
| 51 | 51 | 115 | 179 | 243 |
| 52 | 52 | 116 | 180 | 244 |
| 53 | 53 | 117 | 181 | 245 |
| 54 | 54 | 118 | 182 | 246 |
| 55 | 55 | 119 | 183 | 247 |
| 56 | 56 | 120 | 184 | 248 |
| 57 | 57 | 121 | 185 | 249 |
| 58 | 58 | 122 | 186 | 250 |
| 59 | 59 | 123 | 187 | 251 |
| 60 | 60 | 124 | 188 | 252 |
| 61 | 61 | 125 | 189 | 253 |
| 62 | 62 | 126 | 190 | 254 |
| 63 | 63 | 127 | 191 | 255 |

Figure 6:
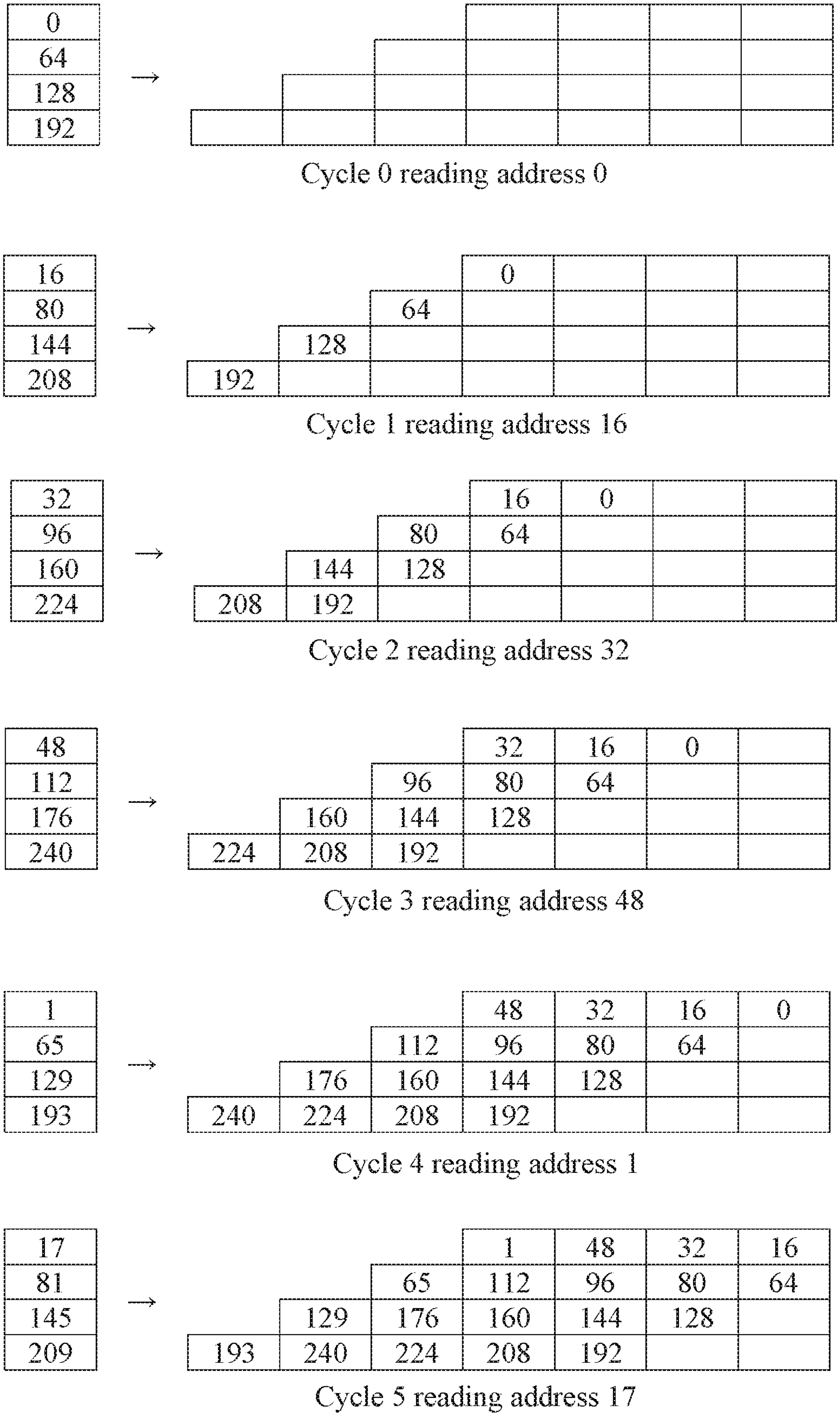
FIG. 6 illustrates, by way of example, a diagram of an embodiment of writing data to shift registers in performing NTT conversions in stages 3 and 4.

Memory Contents after First and Second Stages of Butterfly Operator Circuit 452, 454, 456, 458 Operations Then for stages 3 and 4 that controller 402 can read from the memory using the same scheme used for stages 1 and 2. The contents of the shift registers 401, 499, 498, and 497 are coefficients, not addresses, using this reading scheme are provided with the shift register 401 having depth 4, shift register 499 having depth 5, shift register 498 having depth 6, and shift register 499 having depth 7, as illustrated in FIG. 6.

The output from the butterfly circuits 456, 458 can again be stored by started at address 0 and incrementing the address. Again, there is no conflict, because the address that is being written to has already been read from and the data in these addresses is not necessary. The remaining stages of NTT coefficient generation can likewise be performed with the controller 402 reading every sixteenth address modulo 64 and writing incrementally from address 0 until address 63. The contents of the memory 440 after completing all writing stages is as follows:

| Address | Memory Content after Stage 7 & 8 | | | |
|---|---|---|---|---|
| 0 | 0 | 1 | 2 | 3 |
| 1 | 4 | 5 | 6 | 7 |
| 2 | 8 | 9 | 10 | 11 |
| 3 | 12 | 13 | 14 | 15 |
| 4 | 16 | 17 | 18 | 19 |
| 5 | 20 | 21 | 22 | 23 |
| 6 | 24 | 25 | 26 | 27 |
| 7 | 28 | 29 | 30 | 31 |

-continued

| Address | Memory Content after Stage 7 & 8 | | | |
|---|---|---|---|---|
| 8 | 32 | 33 | 34 | 35 |
| 9 | 36 | 37 | 38 | 39 |
| 10 | 40 | 41 | 42 | 43 |
| 11 | 44 | 45 | 46 | 47 |
| 12 | 48 | 49 | 50 | 51 |
| 13 | 52 | 53 | 54 | 55 |
| 14 | 56 | 57 | 58 | 59 |
| 15 | 60 | 61 | 62 | 63 |
| 16 | 64 | 65 | 66 | 67 |
| 17 | 68 | 69 | 70 | 71 |
| 18 | 72 | 73 | 74 | 75 |
| 19 | 76 | 77 | 78 | 79 |
| 20 | 80 | 81 | 82 | 83 |
| 21 | 84 | 85 | 86 | 87 |
| 22 | 88 | 89 | 90 | 91 |
| 23 | 92 | 93 | 94 | 95 |
| 24 | 96 | 97 | 98 | 99 |
| 25 | 100 | 101 | 102 | 103 |
| 26 | 104 | 105 | 106 | 107 |
| 27 | 108 | 109 | 110 | 111 |
| 28 | 112 | 113 | 114 | 115 |
| 29 | 116 | 117 | 118 | 119 |
| 30 | 120 | 121 | 122 | 123 |
| 31 | 124 | 125 | 126 | 127 |
| 32 | 128 | 129 | 130 | 131 |
| 33 | 132 | 133 | 134 | 135 |
| 34 | 136 | 137 | 138 | 139 |
| 35 | 140 | 141 | 142 | 143 |
| 36 | 144 | 145 | 146 | 147 |
| 37 | 148 | 149 | 150 | 151 |
| 38 | 152 | 153 | 154 | 155 |
| 39 | 156 | 157 | 158 | 159 |
| 40 | 160 | 161 | 162 | 163 |
| 41 | 164 | 165 | 166 | 167 |
| 42 | 168 | 169 | 170 | 171 |
| 43 | 172 | 173 | 174 | 175 |
| 44 | 176 | 177 | 178 | 179 |
| 45 | 180 | 181 | 182 | 183 |
| 46 | 184 | 185 | 186 | 187 |
| 47 | 188 | 189 | 190 | 191 |
| 48 | 192 | 193 | 194 | 195 |
| 49 | 196 | 197 | 198 | 199 |
| 50 | 200 | 201 | 202 | 203 |
| 51 | 204 | 205 | 206 | 207 |
| 52 | 208 | 209 | 210 | 211 |
| 53 | 212 | 213 | 214 | 215 |
| 54 | 216 | 217 | 218 | 219 |
| 55 | 220 | 221 | 222 | 223 |
| 56 | 224 | 225 | 226 | 227 |
| 57 | 228 | 229 | 230 | 231 |
| 58 | 232 | 233 | 234 | 235 |
| 59 | 236 | 237 | 238 | 239 |
| 60 | 240 | 241 | 242 | 243 |
| 61 | 244 | 245 | 246 | 247 |
| 62 | 248 | 249 | 250 | 251 |
| 63 | 252 | 253 | 254 | 255 |

Memory Contents after all Stages of NTT Coefficient Generation Using Butterfly Operator Circuit 452, 454, 456, 458 are Performed The controller 402 reading and writing schemes, along with the circuit 400 saves time by eliminating a need for shuffling and reordering coefficients in the memory 440, while using only a little more memory. To avoid overwriting coefficients in the memory 440 NTT operation results 486 on the coefficients in the memory 440 can be stored to a different block of the memory 440 than the block that stores the coefficients. Consider that the coefficients are stored to a first memory section and the results are stored to a second memory section. Coefficients can be stored in one of the first and second memory sections and the results can be stored in a second, different memory section. This means that coefficients are read from memory section A and NTT results and intermediate results are written to section B for the first round. For the second round, the coefficients are read from memory section B and write into section A. Memory A and B can be on the same memory block with different addresses, e.g., A is addresses [0:63] and B is addresses [64:127]. Alternatively, A and B can be two different memory blocks.

The butterfly circuits 452, 454 provide intermediate results 466, 468, 470, 472 based on input values 474, 476, 478, 480. The intermediate results 466, 468, 470, 472 are provided to further butterfly circuits 456, 458. Results 486 are provided to the memory 440. The entries are written to the memory 440 for further operation by the butterfly operator circuits 452, 454, 456, 458 or NTT conversion.

The memory 440 can include a random access memory (RAM). The memory 440 allows one to read data 492, which is four polynomial coefficients or intermediate values, in a single clock cycle. The memory 440 allows one to write data 490, which is four NTT/INTT converted coefficients or intermediate values, in a single clock cycle. Each of the memory addresses can store two or four values concatenated. The values 444, 446, 448, 450 can be inputs for one or two butterfly circuits 452, 454. In a single memory read cycle from the twiddle factor memory 496, the butterfly circuits 452, 454 can receive a twiddle factor 460. In a single memory read cycle from the twiddle factor memory 496, the butterfly circuits 456, 458 can receive twiddle factors 464, 462, respectively.

The butterfly circuits 452, 454, 456, 458 can be configured as one of the butterfly circuits 100, 200. The butterfly circuits 452 and 454 are electrically situated in parallel. The butterfly circuits 456, 458 are electrically situated in parallel. The butterfly circuit 452 is electrically situated in series with the butterfly circuit 456. The butterfly circuit 452 is electrically situated in series with the butterfly circuit 458. The butterfly circuit 454 is electrically situated in series with the butterfly circuit 456. The butterfly circuit 454 is electrically situated in series with the butterfly circuit 458.

The butterfly circuits 452, 454 operate on the values 474, 476, 478, 480 in one clock cycles to generate values 466, 468, 470, 472. The butterfly circuit 456 receives value 466 from the butterfly circuit 452 and the value 468 from the butterfly circuit 454. The butterfly circuit 458 receives value 470 from the butterfly circuit 452 and the value 472 from the butterfly circuit 454. The butterfly circuit 456 operates on the values 466 and 468, along with twiddle factor 464 to generate values 474, 478. The butterfly circuit 458 operates on the values 470, 472, along with the twiddle factor 462 to generate values 476, 480.

Using the circuit 400, four coefficients are fetched from memory 440 and stored in the buffer 482 in each clock cycle. The results from the butterfly circuits 456, 458 are written back to memory 440.

The multiplexer 484 can provide all four values from one of the shift registers 401, 499, 498, 497, to the butterfly operator circuits 452, 454. The multiplexer 490 can provide either raw coefficient data as data in 488 to the memory 440 or can provide the values 486 from the butterfly operator circuits 456, 458 to the memory 440.

The twiddle factor memory 496 is a read only memory (ROM) that stores the twiddle factors 460, 462, 464 relevant for operation of the butterfly circuits 452, 454, 456, 458.

For a complete NTT operation with 8 stages, which is what is used for a 256-coefficient polynomial (e.g., n=256), the circuit takes $$\frac{8}{2}=4$$

rounds. Each round involves $$\frac{256}{4}=64$$

operations in the circuit 400. Hence, the latency of each round is equal to 64+2+8+4=78 cycles. The total latency for each round of NTT/INTT would be 4×78=312 clock cycles. This is nearly a thousand fold reduction from the sequential technique discussed previously. Considering an operation frequency of 500 MHz for the circuit 400, the throughput would be 1,602k operations/second.

The circuit 400 provides a pure hardware NTT/INTT architecture that offers higher computation speed and flexibility than prior NTT/INTT circuits. The circuit 400 enables one to design a merged-layer hardware architecture of NTT/INTT operation that can be optimized and mapped to a field programmable gate array (FPGA) or application specific integrated circuit (ASIC) platform to develop a high-performance post-quantum cryptography (PQC) architecture.

In operating the circuit 400, the inputs to the butterfly circuits 452, 454 can be chosen such that after each of the butterfly circuits 456, 458 provides a first output the intermediate values required to determine a[0] in the stage 336 are known. This means that a[0] and a[4] from stage 330 are provided as input to the butterfly circuit 452 and that a[2] and a[6] are provided to the butterfly circuit 454. Then, after a second output is received from the butterfly circuits 456, 458 the intermediate values required to determine a[2] at the stage 336 are known by reverse engineering the inputs required. And so on. Thus, the inputs are reverse engineered so that data latency is reduced as compared to other solutions discussed elsewhere. The circuit 400 operating in this way may be referred to as a "hybrid pipelined-serial-parallel" architecture.

Polynomial multiplication in NTT domain can be performed using point-wise multiplication (PWM). Considering the circuit 400 with four butterfly circuits 452, 454, 456, 458, there are 4 modular multipliers (one in each of the four butterfly circuits 452, 454, 456, 458) that can be reused in point-wise multiplication operation. This approach enhances the design from an optimization perspective using a resource sharing technique.

Figure 7:
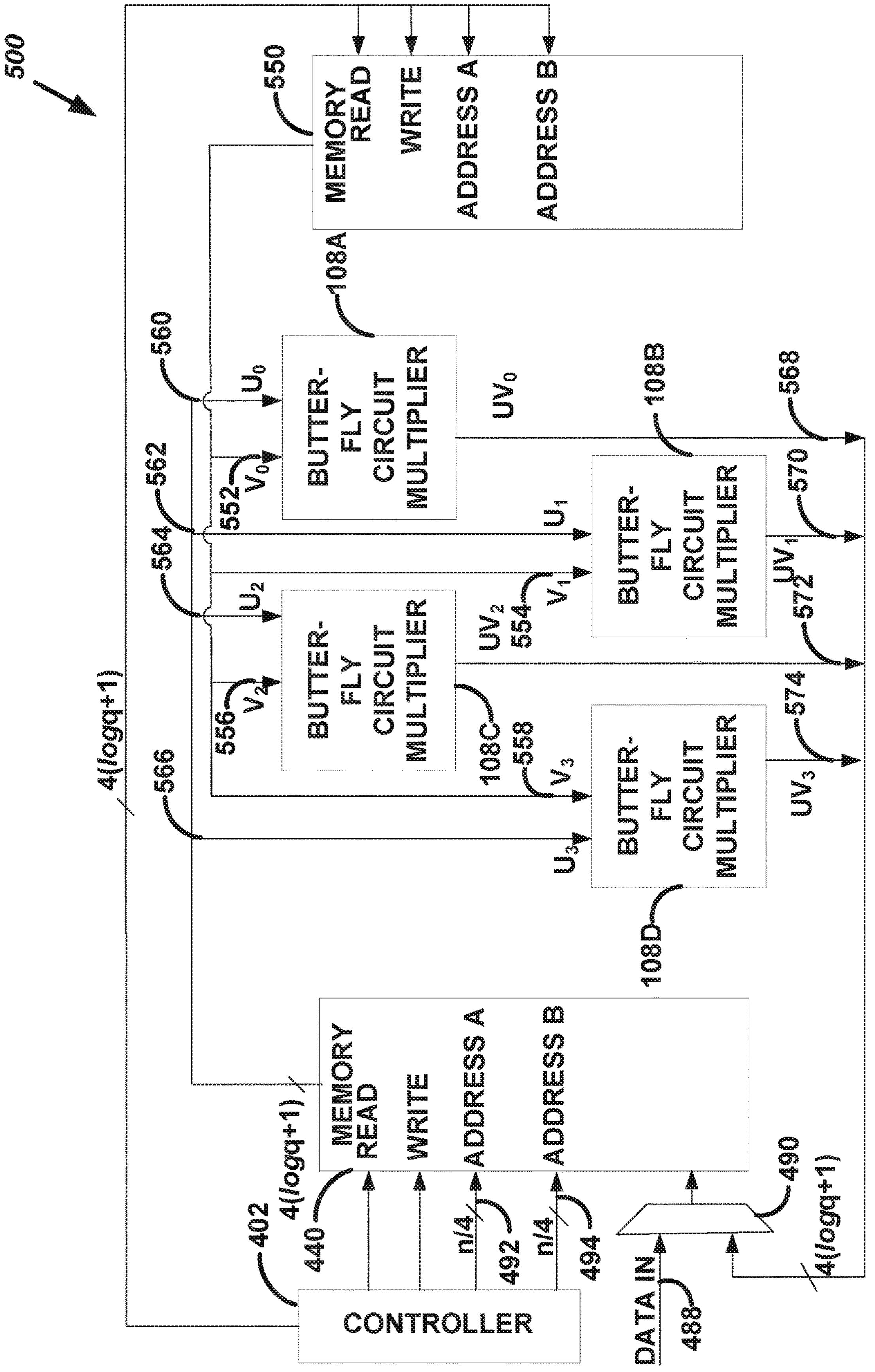
FIG. 7 illustrates, by way of example, a diagram of a circuit for polynomial multiplication in the NTT domain that reuses resources of the circuit of FIG. 4.

FIG. 7 illustrates, by way of example, a diagram of a circuit 500 for polynomial multiplication in the NTT domain that reuses resources of the circuit 400. The circuit 500 as illustrated includes two memories, the memory 440 and a memory 550. The memory 440 includes the coefficients of a first polynomial in NTT domain. The memory 550 includes the coefficients of a second polynomial in NTT domain. The controller 402 controls which addresses are read from each of the memories 440, 550 at a given iteration. Each address of the memories 440, 550 includes four coefficients in the NTT domain. In the example illustrated, coefficients 552, 554, 556, 558 are provided from the memory 550 in a single memory read and the coefficients 560, 562, 564, 566, 568 are provided from the memory 440 in a single memory read.

One coefficient from each memory 440, 550 is provided to each of the multipliers 108A, 108B, 108C, 108D. The multipliers 108A-D are specific instances of the multiplier 108 shown in FIG. 1. Each of the multipliers 108A, 108B, 108C, 108D operate in parallel to generate respective products 568, 570, 572, 574. The products 568, 570, 572, 574 can then be converted out of NTT domain using INTT.

Figure 8:
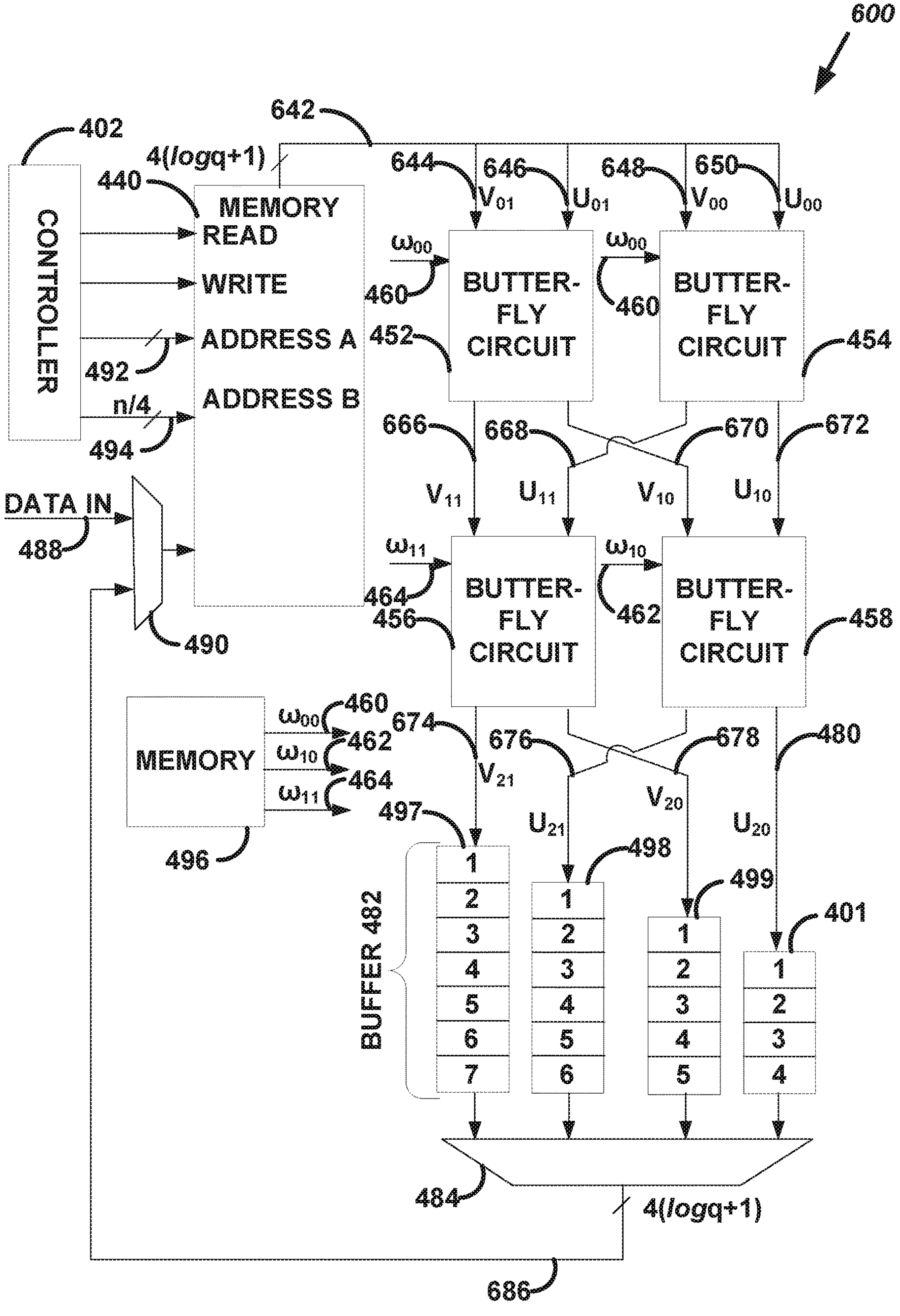
FIG. 8 illustrates, by way of example, a circuit diagram of an embodiment of a circuit for INTT.

FIG. 8 illustrates, by way of example, a circuit diagram of an embodiment of a circuit 600 for INTT. The circuits 400 and 600 each include the same butterfly operator circuits 452, 454, 456, 458, memory 440, 496 and multiplexers 484, 490, controller 402, and buffer 482. The memory 440 is populated with results from coefficient multiplication in the NTT domain using the circuit 500.

The circuit 600 is similar to the circuit 400 with (i) the buffer 482 receiving outputs of butterfly operator circuits 456, 458 instead of providing inputs to butterfly operator circuits 452, 454, and (ii) the memory 440 providing inputs directly to the butterfly operator circuits 452, 454.

The circuit 600 is a merged-layer INTT circuit that includes two pipelined stages with two parallel butterfly operator circuits in each stage level, making 4 butterfly cores in total. The parallel pipelined butterfly cores enable one to perform Radix-4 INTT operation with 4 parallel coefficients.

INTT operation can benefit from a specific memory access pattern that may limit the efficiency of the butterfly operation. For a Dilithium cryptography use case, there are n=256 coefficients per polynomial that requires log n=8 layers of INTT operations. Each butterfly unit takes two coefficients with a difference between the indexes being $2^{i-1}$ in $i^{th}$ stage. That means for the first stage, the given indexes for each butterfly unit are (2*k, 2*k+1):

| |
|---|
| Stage 1 input indexes: {(0, 1), {2, 3), (4, 5), . . . , (254, 255)} |
| Stage 2 input indexes: {(0, 2), {1, 3), (4, 6), . . . , (61, 63), (64, 66), (65, 67), . . . , (253, 255)} |
| . . . |
| Stage 8 input indexes: {(0, 128), {1, 129), (2, 130), . . . , (127, 255)} |

There are several considerations for such access:

(i) 4 coefficients are accessed per cycle to match the throughput into 2×2 butterfly units.

(ii) An optimized architecture provides a memory with only one reading port, and one writing port.

(iii) Based on (i) and (ii), each memory address contains 4 coefficients.

The initial coefficients are stored sequentially by multipliers. Specifically, they begin with 0 and continue incrementally up to 255. Hence, at the very beginning cycle, the memory contains coefficients (0, 1, 2, 3) in the first address, coefficients (4, 5, 6, 7) in second address, and so on.

The cost of in-place memory relocation to align the memory content is not negligible. Particularly, it needs to be repeated for each stage. While memory bandwidth limits the efficiency of the butterfly operation, a specific memory pattern can be used to store four coefficients per address.

The circuit 600 includes a controller 402 that reads memory in a particular pattern and uses a set of buffer 482 to reorganize and write the intermediate coefficients and the INTT transformed coefficients to the memory 440.

The initial contents of the memory 440 includes the indexes as follows:

| Address | Initial Memory Content | | | |
|---|---|---|---|---|
| 0 | 0 | 1 | 2 | 3 |
| 1 | 4 | 5 | 6 | 7 |

-continued

| Address | Initial Memory Content | | | |
|---|---|---|---|---|
| 2 | 8 | 9 | 10 | 11 |
| 3 | 12 | 13 | 14 | 15 |
| 4 | 16 | 17 | 18 | 19 |
| 5 | 20 | 21 | 22 | 23 |
| 6 | 24 | 25 | 26 | 27 |
| 7 | 28 | 29 | 30 | 31 |
| 8 | 32 | 33 | 34 | 35 |
| 9 | 36 | 37 | 38 | 39 |
| 10 | 40 | 41 | 42 | 43 |
| 11 | 44 | 45 | 46 | 47 |
| 12 | 48 | 49 | 50 | 51 |
| 13 | 52 | 53 | 54 | 55 |
| 14 | 56 | 57 | 58 | 59 |
| 15 | 60 | 61 | 62 | 63 |
| 16 | 64 | 65 | 66 | 67 |
| 17 | 68 | 69 | 70 | 71 |
| 18 | 72 | 73 | 74 | 75 |
| 19 | 76 | 77 | 78 | 79 |
| 20 | 80 | 81 | 82 | 83 |
| 21 | 84 | 85 | 86 | 87 |
| 22 | 88 | 89 | 90 | 91 |
| 23 | 92 | 93 | 94 | 95 |
| 24 | 96 | 97 | 98 | 99 |
| 25 | 100 | 101 | 102 | 103 |
| 26 | 104 | 105 | 106 | 107 |
| 27 | 108 | 109 | 110 | 111 |
| 28 | 112 | 113 | 114 | 115 |
| 29 | 116 | 117 | 118 | 119 |
| 30 | 120 | 121 | 122 | 123 |
| 31 | 124 | 125 | 126 | 127 |
| 32 | 128 | 129 | 130 | 131 |
| 33 | 132 | 133 | 134 | 135 |
| 34 | 136 | 137 | 138 | 139 |
| 35 | 140 | 141 | 142 | 143 |
| 36 | 144 | 145 | 146 | 147 |
| 37 | 148 | 149 | 150 | 151 |
| 38 | 152 | 153 | 154 | 155 |
| 39 | 156 | 157 | 158 | 159 |
| 40 | 160 | 161 | 162 | 163 |
| 41 | 164 | 165 | 166 | 167 |
| 42 | 168 | 169 | 170 | 171 |
| 43 | 172 | 173 | 174 | 175 |
| 44 | 176 | 177 | 178 | 179 |
| 45 | 180 | 181 | 182 | 183 |
| 46 | 184 | 185 | 186 | 187 |
| 47 | 188 | 189 | 190 | 191 |
| 48 | 192 | 193 | 194 | 195 |
| 49 | 196 | 197 | 198 | 199 |
| 50 | 200 | 201 | 202 | 203 |
| 51 | 204 | 205 | 206 | 207 |
| 52 | 208 | 209 | 210 | 211 |
| 53 | 212 | 213 | 214 | 215 |
| 54 | 216 | 217 | 218 | 219 |
| 55 | 220 | 221 | 222 | 223 |
| 56 | 224 | 225 | 226 | 227 |
| 57 | 228 | 229 | 230 | 231 |
| 58 | 232 | 233 | 234 | 235 |
| 59 | 236 | 237 | 238 | 239 |
| 60 | 240 | 241 | 242 | 243 |
| 61 | 244 | 245 | 246 | 247 |
| 62 | 248 | 249 | 250 | 251 |
| 63 | 252 | 253 | 254 | 255 |

Initial Contents of the Memory 440 Before INTT Operation

The controller 402 can read from the memory 440 by starting at zero and incrementing the address by one after each read, making the read pattern:

Reading Address Order: 0, 1, 2, 3, 4, . . . , 62, 63

The input goes to the butterfly operator circuits 452, 454. The input values contain the required coefficients for our butterfly units in the next stage, i.e., (0, 1) and (2, 3). Since the first and second stages of INTT are merged in the circuit 600, the output of the first stage of parallel butterfly circuits 452, 454 is provided to the second stage of butterfly operator circuits 456, 458.

Figure 9:
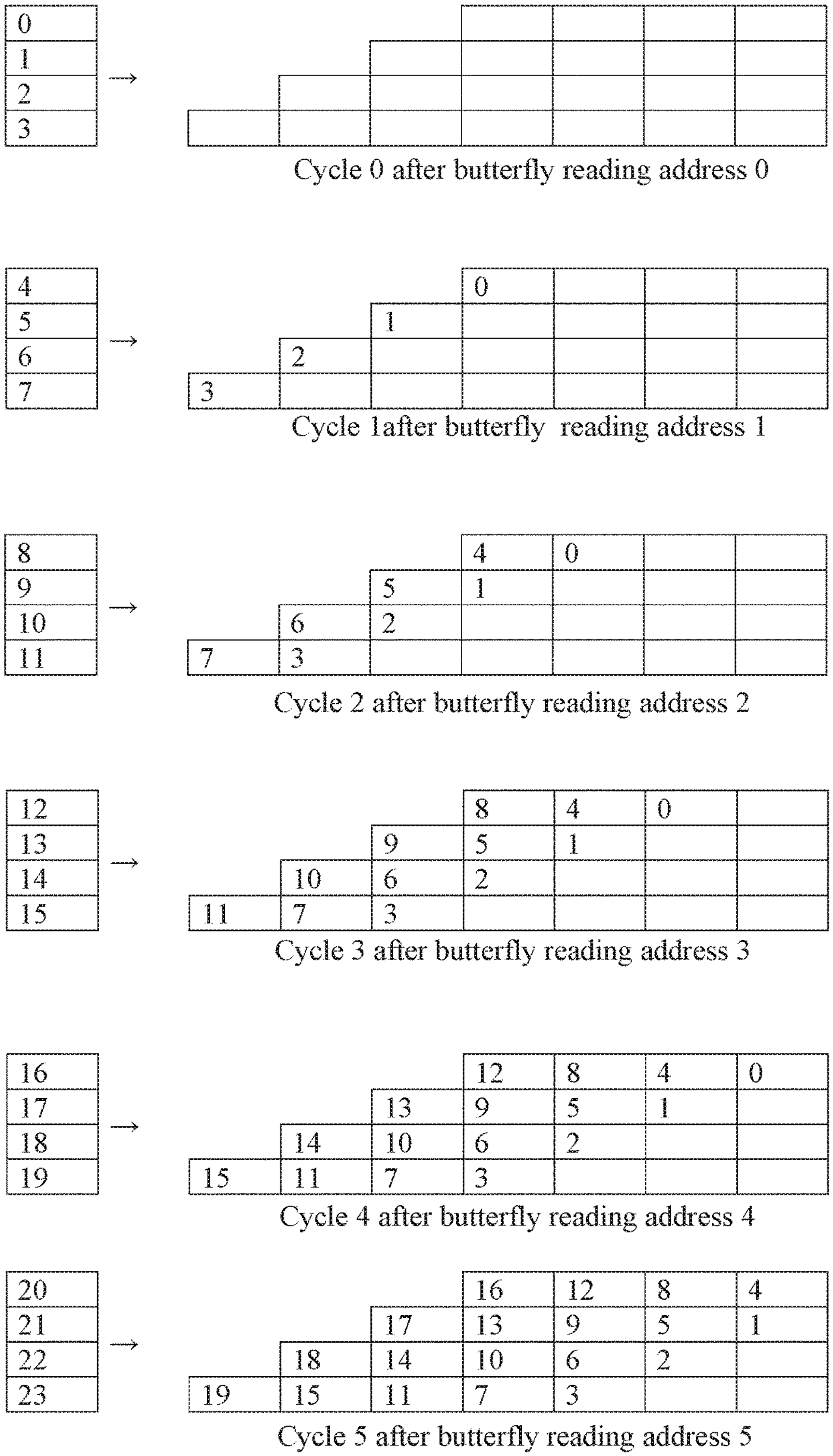
FIG. 9 illustrates, by way of example, a diagram of an embodiment of writing data to shift registers in performing INTT conversions in stages 1 and 2.

To prepare the results for the next stages, the output is stored into the customized buffer 482 architecture as illustrated in FIG. 9.

After four cycles the first shift register 401 includes the coefficients for the butterfly units in the third stage, i.e., (0, 4) and (8, 12).

However, the output can benefit from being written in a particular pattern as follows:

Writing Address Order: 0, 16, 32, 48, 1, 17, 33, 49, . . . , 15, 31, 47, 63

After completing the first round of operation including INTT stage 1 and 2, the memory contains the following data:

| Address | Memory Content after 1 & 2 stages | | | |
|---|---|---|---|---|
| 0 | 0 | 4 | 8 | 12 |
| 1 | 16 | 20 | 24 | 28 |
| 2 | 32 | 36 | 40 | 44 |
| 3 | 48 | 52 | 56 | 60 |
| 4 | 64 | 68 | 72 | 76 |
| 5 | 80 | 84 | 88 | 92 |
| 6 | 96 | 100 | 104 | 108 |
| 7 | 112 | 116 | 120 | 124 |
| 8 | 128 | 132 | 136 | 140 |
| 9 | 144 | 148 | 152 | 156 |
| 10 | 160 | 164 | 168 | 172 |
| 11 | 176 | 180 | 184 | 188 |
| 12 | 192 | 196 | 200 | 204 |
| 13 | 208 | 212 | 216 | 220 |
| 14 | 224 | 228 | 232 | 236 |
| 15 | 240 | 244 | 248 | 252 |
| 16 | 1 | 5 | 9 | 13 |
| 17 | 17 | 21 | 25 | 29 |
| 18 | 33 | 37 | 41 | 45 |
| 19 | 49 | 53 | 57 | 61 |
| 20 | 65 | 69 | 73 | 77 |
| 21 | 81 | 85 | 89 | 93 |
| 22 | 97 | 101 | 105 | 109 |
| 23 | 113 | 117 | 121 | 125 |
| 24 | 129 | 133 | 137 | 141 |
| 25 | 145 | 149 | 153 | 157 |
| 26 | 161 | 165 | 169 | 173 |
| 27 | 177 | 181 | 185 | 189 |
| 28 | 193 | 197 | 201 | 205 |
| 29 | 209 | 213 | 217 | 221 |
| 30 | 225 | 229 | 233 | 237 |
| 31 | 241 | 245 | 249 | 253 |
| 32 | 2 | 6 | 10 | 14 |
| 33 | 18 | 22 | 26 | 30 |
| 34 | 34 | 38 | 42 | 46 |
| 35 | 50 | 54 | 58 | 62 |
| 36 | 66 | 70 | 74 | 78 |
| 37 | 82 | 86 | 90 | 94 |
| 38 | 98 | 102 | 106 | 110 |
| 39 | 114 | 118 | 122 | 126 |
| 40 | 130 | 134 | 138 | 142 |
| 41 | 146 | 150 | 154 | 158 |
| 42 | 162 | 166 | 170 | 174 |
| 43 | 178 | 182 | 186 | 190 |
| 44 | 194 | 198 | 202 | 206 |
| 45 | 210 | 214 | 218 | 222 |
| 46 | 226 | 230 | 234 | 238 |
| 47 | 242 | 246 | 250 | 254 |
| 48 | 3 | 7 | 11 | 15 |
| 49 | 19 | 23 | 27 | 31 |
| 50 | 35 | 39 | 43 | 47 |
| 51 | 51 | 55 | 59 | 63 |
| 52 | 67 | 71 | 75 | 79 |
| 53 | 83 | 87 | 91 | 95 |
| 54 | 99 | 103 | 107 | 111 |
| 55 | 115 | 119 | 123 | 127 |
| 56 | 131 | 135 | 139 | 143 |
| 57 | 147 | 151 | 155 | 159 |
| 58 | 163 | 167 | 171 | 175 |
| 59 | 179 | 183 | 187 | 191 |
| 60 | 195 | 199 | 203 | 207 |
| 61 | 211 | 215 | 219 | 223 |

-continued

| Address | Memory Content after 1 & 2 stages | | | |
|---|---|---|---|---|
| 62 | 227 | 231 | 235 | 239 |
| 63 | 243 | 247 | 251 | 255 |

Figure 10:
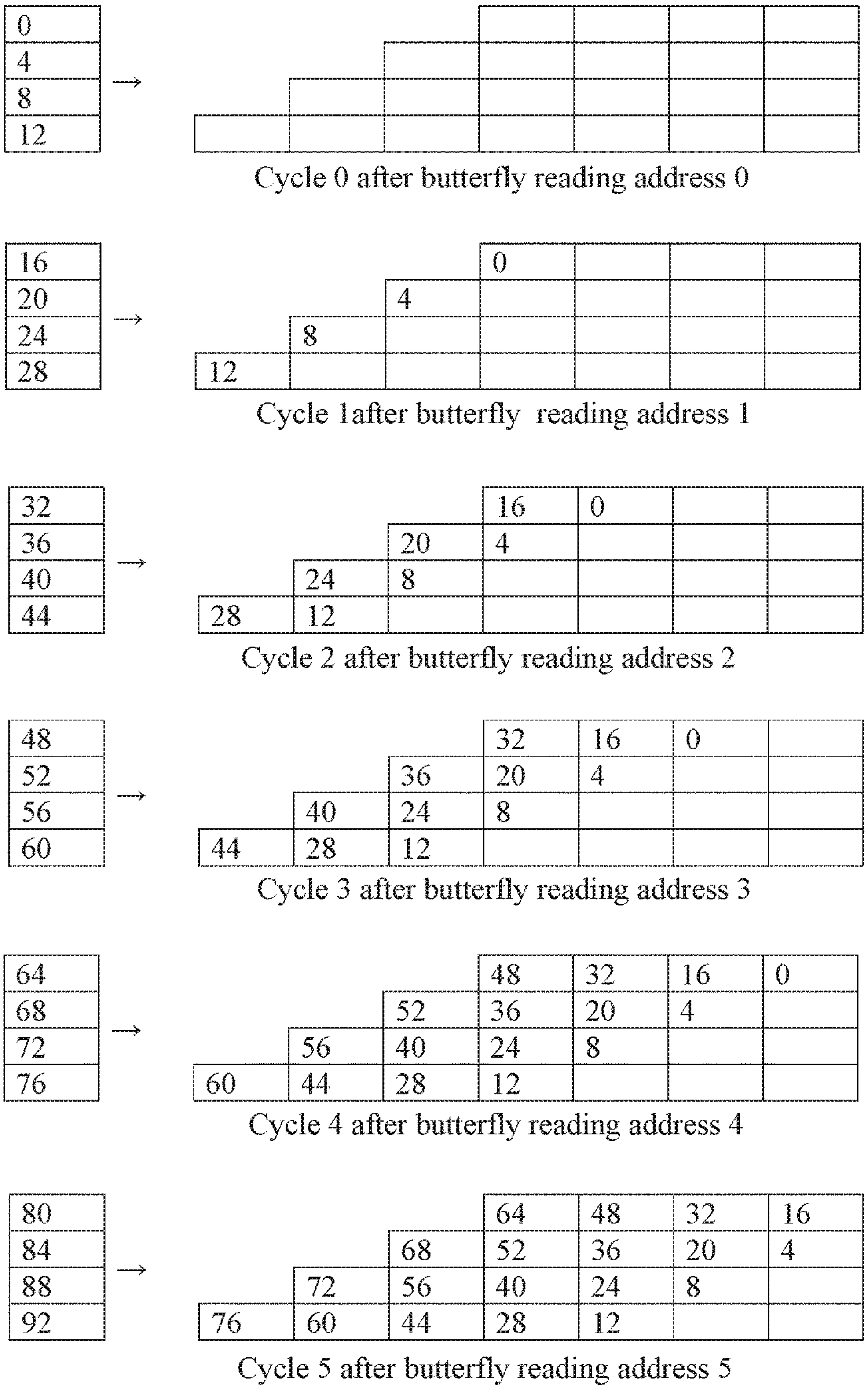
FIG. 10 illustrates, by way of example, a diagram of an embodiment of writing data to shift registers in performing INTT conversions in stages 3 and 4.

Contents of the Memory 440 after Completing Stages 1 and 2 of INTT Operation The same process can be applied in the next round to perform INTT stage 3 and 4. To prepare the results for the next stages, the output is stored into the customized buffer 482 architecture as illustrated in FIG. 10.

After completing all stages, the memory 440 contents would be as follows:

| Address | Memory Content after Stage 7 & 8 | | | |
|---|---|---|---|---|
| 0 | 0 | 1 | 2 | 3 |
| 1 | 4 | 5 | 6 | 7 |
| 2 | 8 | 9 | 10 | 11 |
| 3 | 12 | 13 | 14 | 15 |
| 4 | 16 | 17 | 18 | 19 |
| 5 | 20 | 21 | 22 | 23 |
| 6 | 24 | 25 | 26 | 27 |
| 7 | 28 | 29 | 30 | 31 |
| 8 | 32 | 33 | 34 | 35 |
| 9 | 36 | 37 | 38 | 39 |
| 10 | 40 | 41 | 42 | 43 |
| 11 | 44 | 45 | 46 | 47 |
| 12 | 48 | 49 | 50 | 51 |
| 13 | 52 | 53 | 54 | 55 |
| 14 | 56 | 57 | 58 | 59 |
| 15 | 60 | 61 | 62 | 63 |
| 16 | 64 | 65 | 66 | 67 |
| 17 | 68 | 69 | 70 | 71 |
| 18 | 72 | 73 | 74 | 75 |
| 19 | 76 | 77 | 78 | 79 |
| 20 | 80 | 81 | 82 | 83 |
| 21 | 84 | 85 | 86 | 87 |
| 22 | 88 | 89 | 90 | 91 |
| 23 | 92 | 93 | 94 | 95 |
| 24 | 96 | 97 | 98 | 99 |
| 25 | 100 | 101 | 102 | 103 |
| 26 | 104 | 105 | 106 | 107 |
| 27 | 108 | 109 | 110 | 111 |
| 28 | 112 | 113 | 114 | 115 |
| 29 | 116 | 117 | 118 | 119 |
| 30 | 120 | 121 | 122 | 123 |
| 31 | 124 | 125 | 126 | 127 |
| 32 | 128 | 129 | 130 | 131 |
| 33 | 132 | 133 | 134 | 135 |
| 34 | 136 | 137 | 138 | 139 |
| 35 | 140 | 141 | 142 | 143 |
| 36 | 144 | 145 | 146 | 147 |
| 37 | 148 | 149 | 150 | 151 |
| 38 | 152 | 153 | 154 | 155 |
| 39 | 156 | 157 | 158 | 159 |
| 40 | 160 | 161 | 162 | 163 |
| 41 | 164 | 165 | 166 | 167 |
| 42 | 168 | 169 | 170 | 171 |
| 43 | 172 | 173 | 174 | 175 |
| 44 | 176 | 177 | 178 | 179 |
| 45 | 180 | 181 | 182 | 183 |
| 46 | 184 | 185 | 186 | 187 |
| 47 | 188 | 189 | 190 | 191 |
| 48 | 192 | 193 | 194 | 195 |
| 49 | 196 | 197 | 198 | 199 |
| 50 | 200 | 201 | 202 | 203 |
| 51 | 204 | 205 | 206 | 207 |
| 52 | 208 | 209 | 210 | 211 |
| 53 | 212 | 213 | 214 | 215 |
| 54 | 216 | 217 | 218 | 219 |
| 55 | 220 | 221 | 222 | 223 |
| 56 | 224 | 225 | 226 | 227 |
| 57 | 228 | 229 | 230 | 231 |
| 58 | 232 | 233 | 234 | 235 |
| 59 | 236 | 237 | 238 | 239 |

-continued

| Address | Memory Content after Stage 7 & 8 | | | |
|---|---|---|---|---|
| 60 | 240 | 241 | 242 | 243 |
| 61 | 244 | 245 | 246 | 247 |
| 62 | 248 | 249 | 250 | 251 |
| 63 | 252 | 253 | 254 | 255 |

The method saves the time needed for shuffling and reordering, while using only a little more memory.

The circuit 600 improves time latency in performing INTT conversions. The circuit 600 as illustrated includes the memory 440 that provides coefficients and intermediate INTT conversion values 644, 646, 648, 650 (jointly coefficient or intermediate results 642) to butterfly circuits 452, 454, 456, 458, respectively. The butterfly circuits 452, 454 provide intermediate results 666, 668, 670, 672 to further butterfly circuits 456, 458. Results 674, 676, 678, 680 are provided to the buffer 482. Multiplexers 484, 490 select buffer 482 entries or data in 488 (polynomial coefficients) to be written to the memory 440 for INTT conversion.

The butterfly circuits 452, 454 operate on the values 644, 646, 648, 650 in one clock cycles to generate values 666, 668, 670, 672. The butterfly circuit 456 receives value 666 from the butterfly circuit 452 and the value 668 from the butterfly circuit 454. The butterfly circuit 458 receives value 670 from the butterfly circuit 452 and the value 672 from the butterfly circuit 454. The butterfly circuit 456 operates on the values 666 and 668, along with twiddle factor 464 to generate values 674, 678. The butterfly circuit 458 operates on the values 670, 672, along with the twiddle factor 462 to generate values 676, 680.

The values 674, 676, 678, and 680 can be stored in a buffer 482 comprised of the shift registers 401, 497, 498, 499. Entries can be read from the buffer 482 and written to the memory 440. The entries in the memory 440 can be final results of the INTT conversion or can intermediate values that can be operated on further by the butterfly circuits 452, 454, 456, 458. The values 674, 676, 678, 680 can be stored in the buffer 482 in an order that is conducive for writing to the memory 440. The order is indicated by Arabic numerals in the buffer 482. At each new output of the butterfly circuits 456, 458 a new value can be stored in each shift register 497, 498, 499, 401 and each value currently stored in the shift register can be shifted to an entry associated with an immediately higher Arabic numeral.

The serial-parallel architecture of the circuit 600 ultimately leads to improvements in the performance and efficiency of the INTT computation. To reduce the memory access overhead, which is the main challenge in an NTT/INTT design, a set of shift registers 401, 499, 498, 497 with SIPO (serial-in, parallel-out) configuration with different depths are used.

Using the circuit 400, four coefficients are fetched from memory and sent to butterfly circuits 452, 454 in each clock cycle. The outputs from the butterfly circuits 456, 458 are stored in four different shift registers 401, 499, 498, 497 that have serial-in, parallel-out mode. The results from the butterfly circuits 456, 458 are written back to memory by reading the different shift registers 401, 499, 498, 497 one by one. The first shift register 401 is full after 4 outputs are received from the butterfly circuit 458, and the 4 coefficients from the shift register 401 can be saved in the memory 440. The shift register 401 is full every four clock cycles after four full operations of the butterfly circuit 458 are completed. The same thing happens after one more clock cycle for the second shift register 499 and so on for the third and fourth shift registers 498 and 497, and their first 4-coefficients are saved to the memory 440.

Figure 11:
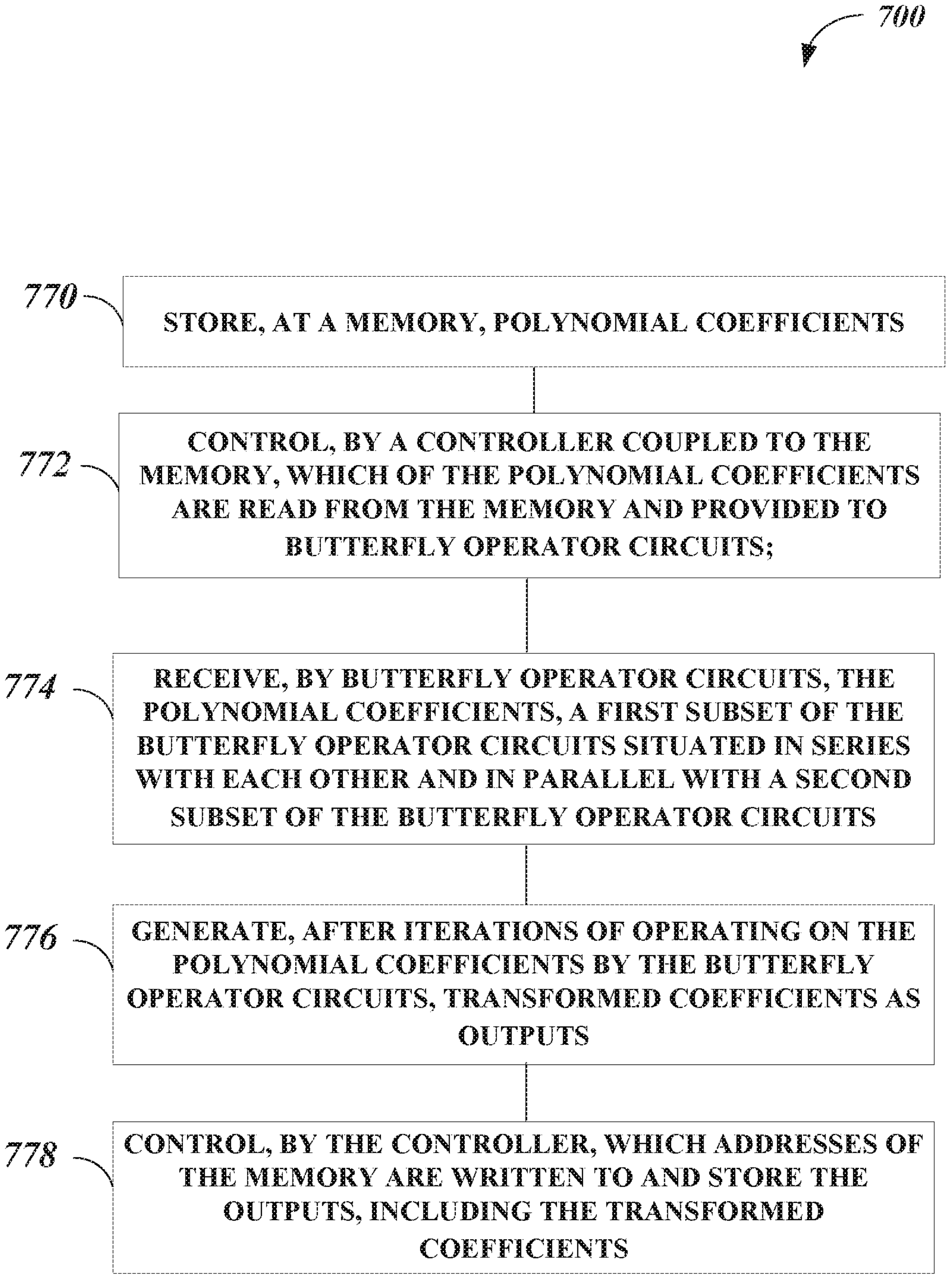
FIG. 11 illustrates, by way of example, a block diagram of an embodiment of a method for improved NTT/INTT.

FIG. 11 illustrates, by way of example, a block diagram of an embodiment of a method 700 for improved NTT/INTT. The method 700 as illustrated includes storing, at a memory, polynomial coefficients, at operation 770; controlling, by a controller coupled to the memory, which of the polynomial coefficients are read from the memory and provided to butterfly operator circuits, at operation 772; receiving, by butterfly operator circuits, the polynomial coefficients, a first subset of the butterfly operator circuits situated in series with each other and in parallel with a second subset of the butterfly operator circuits, at operation 774; generating, after iterations of operating on the polynomial coefficients by the butterfly operator circuits, transformed coefficients as outputs, at operation 776; and controlling, by the controller, which addresses of the memory are written to and store the outputs, including the transformed coefficients, at operation 778.

The controller (i) either reads from or writes to the memory addresses in sequential order and (ii) either writes to or reads from the memory addresses in a non-sequential order. The non-sequential order can include, in each two stages of NTT or INTT, writing to or reading from every sixteenth address modulo sixty-four until an address is repeated.

The method 700 can be for performing NTT. In performing NTT, the controller reads from the memory addresses in non-sequential order and writes to the memory addresses in sequential order. The method can be for performing INTT. In performing INTT, the controller can read from the memory addresses in sequential order and writes to the memory addresses in non-sequential order.

The method 700 can further include multiplying, by a modular multiplier of each of the butterfly operator circuits and after performing NTT, polynomial coefficients in NTT domain. The method 700 can further include receiving, by first, second, third, and fourth shift registers that each has a different depth, respective output coefficients or polynomial coefficients. The method 700 can further include providing, by a first multiplexer and based on a select control of the first multiplexer, contents of the first, second, third, and fourth shift registers in consecutive, respective clock cycles.

Figure 12:
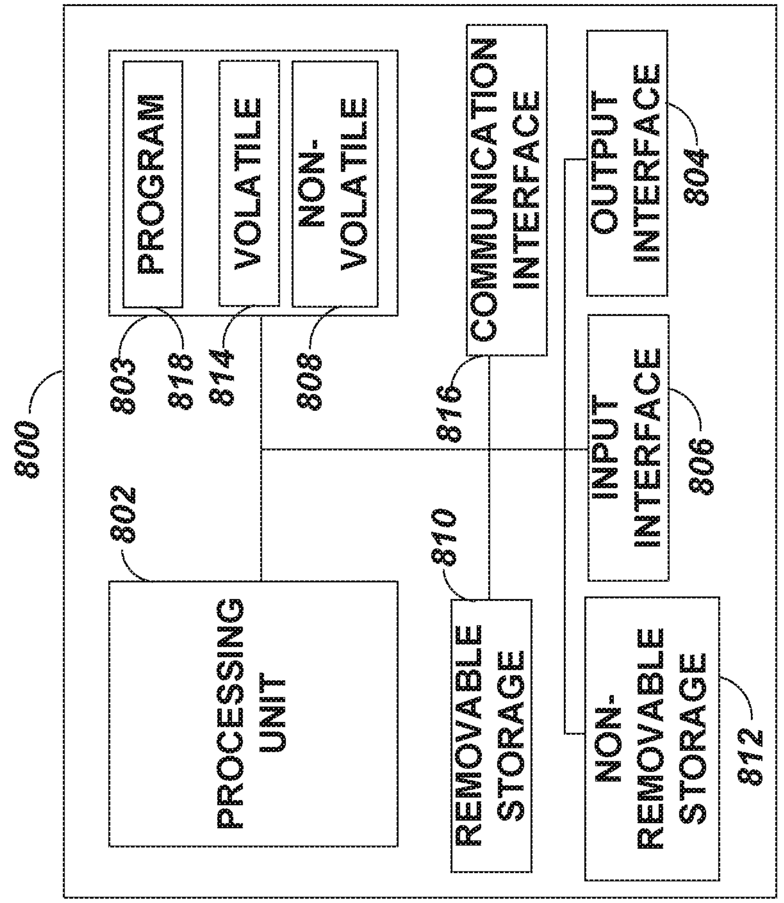
FIG. 12 illustrates, by way of example, a block diagram of an embodiment of a machine (e.g., a computer system) to implement one or more embodiments.

FIG. 12 illustrates, by way of example, a block diagram of an embodiment of a machine 800 (e.g., a computer system) to implement one or more embodiments. The machine 800 can implement a technique for NTT/INTT. Any of the CT butterfly operator circuit 100, GS butterfly operator circuit 200, butterfly operator circuit 452, 454, 456, 458, stage 330, 332, 334, 336, memory 440, 496, multiplexer 484, 490, shift register 401, 497, 498, 499, method 700 or a component or operation thereof can include one or more of the components of the machine 800. One or more of the CT butterfly operator circuit 100, GS butterfly operator circuit 200, butterfly operator circuit 452, 454, 456, 458, stage 330, 332, 334, 336, memory 440, 496, multiplexer 484, 490, shift register 401, 497, 498, 499, method 700, or a component or operations thereof can be implemented, at least in part, using a component of the machine 800. One example machine 800 (in the form of a computer), may include a processing unit 802, memory 803, removable storage 810, and non-removable storage 812. Although the example computing device is illustrated and described as machine 800, the computing device may be in different forms in different embodiments. For example, the computing device may instead be a smartphone, a tablet, smartwatch, or other computing device including the same or similar elements as illustrated and described regarding FIG. 12. Devices such as smartphones, tablets, and smartwatches are generally collectively referred to as mobile devices. Further, although the various data storage elements are illustrated as part of the machine 800, the storage may also or alternatively include cloud-based storage accessible via a network, such as the Internet.

Memory 803 may include volatile memory 814 and non-volatile memory 808. The machine 800 may include—or have access to a computing environment that includes—a variety of computer-readable media, such as volatile memory 814 and non-volatile memory 808, removable storage 810 and non-removable storage 812. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices capable of storing computer-readable instructions for execution to perform functions described herein.

The machine 800 may include or have access to a computing environment that includes input 806, output 804, and a communication connection 816. Output 804 may include a display device, such as a touchscreen, that also may serve as an input device. The input 806 may include one or more of a touchscreen, touchpad, mouse, keyboard, camera, one or more device-specific buttons, one or more sensors integrated within or coupled via wired or wireless data connections to the machine 800, and other input devices. The computer may operate in a networked environment using a communication connection to connect to one or more remote computers, such as database servers, including cloud-based servers and storage. The remote computer may include a personal computer (PC), server, router, network PC, a peer device or other common network node, or the like. The communication connection may include a Local Area Network (LAN), a Wide Area Network (WAN), cellular, Institute of Electrical and Electronics Engineers (IEEE) 802.11 (Wi-Fi), Bluetooth, or other networks.

Computer-readable instructions stored on a computer-readable storage device are executable by the processing unit 802 (sometimes called processing circuitry) of the machine 800. A hard drive, CD-ROM, and RAM are some examples of articles including a non-transitory computer-readable medium such as a storage device. For example, a computer program 818 may be used to cause processing unit 802 to perform one or more methods or algorithms described herein.

The operations, functions, or algorithms described herein may be implemented in software in some embodiments. The software may include computer executable instructions stored on computer or other machine-readable media or storage device, such as one or more non-transitory memories (e.g., a non-transitory machine-readable medium) or other type of hardware based storage devices, either local or networked. Further, such functions may correspond to subsystems, which may be software, hardware, firmware, or a combination thereof. Multiple functions may be performed in one or more subsystems as desired, and the embodiments described are merely examples. The software may be executed on a digital signal processor, ASIC, microprocessor, central processing unit (CPU), graphics processing unit (GPU), field programmable gate array (FPGA), or other type of processor operating on a computer system, such as a personal computer, server or other computer system, turning such computer system into a specifically programmed machine. The functions or algorithms may be implemented using processing circuitry, such as may include electric and/or electronic components (e.g., one or more transistors, resistors, capacitors, inductors, amplifiers, modulators, demodulators, antennas, radios, regulators, diodes, oscillators, multiplexers, logic gates, buffers, caches, memories, GPUs, CPUs, field programmable gate arrays (FPGAs), or the like).

ADDITIONAL NOTES AND EXAMPLES

Example 1 includes a circuit for number theoretic transform (NTT) or inverse NTT (INTT) comprising a memory configured to store polynomial coefficients, butterfly operator circuits coupled to receive the polynomial coefficients and generate, after iterations of operating on the polynomial coefficients, transformed coefficients as outputs, a first subset of the butterfly operator circuits situated in series with each other and in parallel with a second subset of the butterfly operator circuits, shift registers coupled between the butterfly operator circuits and the memory, and a controller coupled to the memory, the controller configured to control which coefficients are provided to the butterfly operator circuits and which addresses of the memory store the outputs.

In Example 2, Example 1 further includes, wherein the controller is configured to (i) either read from or write to the memory addresses in sequential order and (ii) write to or read from the memory addresses in a non-sequential order.

In Example 3, Example 2 further includes, wherein the non-sequential order includes, in each two stages of NTT or INTT, writing to or reading from every sixteenth address modulo sixty-four until an address is repeated.

In Example 4, at least one of Examples 1-3 further includes, wherein the circuit is configured to perform NTT, the shift registers are situated to receive the polynomial coefficients, and the controller is configured to read from the memory addresses in non-sequential order and write to the memory addresses in sequential order.

In Example 5, at least one of Examples 1~4 further includes, wherein the circuit is configured to perform INTT, the shift registers are situated to receive the outputs of the butterfly operator circuits, and the controller is configured to read from the memory addresses in sequential order and write to the memory addresses in non-sequential order.

In Example 6, at least one of Examples 1-5 further includes, wherein a modular multiplier of each of the butterfly operator circuits is configured, after performing NTT, to multiply polynomial coefficients in NTT domain.

In Example 7, at least one of Examples 1-6 further includes, wherein the shift registers include first, second, third, and fourth shift registers situated to respective output coefficients.

In Example 8, Example 7 further includes, wherein each of the first, second, third, and fourth shift registers each has a different depth.

In Example 9, Example 8 further includes, wherein the depth of the first, second, third, and fourth shift registers is four, five, six, and seven, respectively.

In Example 10, at least one of Examples 7-9 further includes a first multiplexer configured to provide, based on a select control of the first multiplexer, contents of the first, second, third, and fourth shift registers in consecutive, respective clock cycles.

Example 11 includes a method for number theoretic transform (NTT) or inverse NTT (INTT) comprising storing, at a memory, polynomial coefficients, controlling, by a controller coupled to the memory, which of the polynomial coefficients are read from the memory and provided to butterfly operator circuits, receiving, by butterfly operator circuits, the polynomial coefficients, a first subset of the butterfly operator circuits situated in series with each other and in parallel with a second subset of the butterfly operator circuits, generating, after iterations of operating on the polynomial coefficients by the butterfly operator circuits, transformed coefficients as outputs, and controlling, by the controller, which addresses of the memory are written to and store the outputs, including the transformed coefficients.

In Example 12, Example 11 further includes, wherein the controller (i) either reads from or writes to the memory addresses in sequential order and (ii) either writes to or reads from the memory addresses in a non-sequential order.

In Example 13, Example 12 further includes, wherein the non-sequential order includes, in each two stages of NTT or INTT, writing to or reading from every sixteenth address modulo sixty-four until an address is repeated.

In Example 14, at least one of Examples 11-13 further includes, wherein the method is for performing NTT, and the controller reads from the memory addresses in non-sequential order and writes to the memory addresses in sequential order.

In Example 15, at least one of Examples 11-14 further includes, wherein the method is for performing INTT, and the controller reads from the memory addresses in sequential order and writes to the memory addresses in non-sequential order.

In Example 16, at least one of Examples 11-15 further includes multiplying, by a modular multiplier of each of the butterfly operator circuits and after performing NTT, polynomial coefficients in NTT domain.

In Example 17, at least one of Examples 11-16 further includes receiving, by first, second, third, and fourth shift registers that each has a different depth, respective output coefficients or polynomial coefficients, and providing, by a first multiplexer and based on a select control of the first multiplexer, contents of the first, second, third, and fourth shift registers in consecutive, respective clock cycles.

Example 18 includes a system comprising a memory including polynomial coefficients stored thereon, butterfly operator circuits configured to receive the polynomial coefficients and generate, after iterations of operating on the polynomial coefficients, transformed coefficients as outputs, a first subset of the butterfly operator circuits situated in series with each other and in parallel with a second subset of the butterfly operator circuits, first, second, third, and fourth shift registers with different depths coupled between the butterfly operator circuits and the memory, a first multiplexer configured to provide, based on a select control of the first multiplexer, contents of the first, second, third, and fourth shift registers in consecutive, respective clock cycles, and a controller coupled to the memory, the controller configured to control which coefficients are provided to the butterfly operator circuits and which addresses of the memory store the outputs, including the transformed coefficients.

In Example 19, Example 18 further includes, wherein the system is configured to perform number theoretic transform (NTT), the first, second, third, and fourth shift registers are situated to receive the polynomial coefficients, and the controller is configured to read from the memory addresses in non-sequential order and write to the memory addresses in sequential order.

In Example 20, at least one of Examples 18-19 further includes, wherein the system is configured to perform INTT, the first, second, third, and fourth shift registers are situated to receive the outputs of the butterfly operator circuits, and the controller is configured to read from the memory addresses in sequential order and write to the memory addresses in non-sequential order.

Although a few embodiments have been described in detail above, other modifications are possible. For example, the logic flows depicted in the figures do not require the order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. A circuit for number theoretic transform (NTT) or inverse NTT (INTT) comprising:

a memory configured to store polynomial coefficients;

butterfly operator circuits coupled to receive the polynomial coefficients and generate, after iterations of operating on the polynomial coefficients, transformed coefficients as outputs, a first subset of the butterfly operator circuits situated in series with each other and in parallel with a second subset of the butterfly operator circuits;

serial-in parallel-out shift registers coupled between the butterfly operator circuits and the memory, each of the shift registers including a different depth; and a controller coupled to the memory, the controller configured to control which coefficients are provided to the butterfly operator circuits and which addresses of the memory store the outputs.

2. The circuit of claim 1, wherein the controller is configured to (i) either read from or write to the memory addresses in sequential order and (ii) write to or read from the memory addresses in a non-sequential order.

3. The circuit of claim 2, wherein the non-sequential order includes, in each two stages of NTT or INTT, writing to or reading from every sixteenth address modulo sixty-four until an address is repeated.

4. The circuit of claim 1, wherein:

the circuit is configured to perform NTT;

the shift registers are situated to receive the polynomial coefficients; and the controller is configured to read from the memory addresses in non-sequential order and write to the memory addresses in sequential order.

5. The circuit of claim 1, wherein:

the circuit is configured to perform INTT;

the shift registers are situated to receive the outputs of the butterfly operator circuits; and the controller is configured to read from the memory addresses in sequential order and write to the memory addresses in non-sequential order.

6. The circuit of claim 1, wherein:

a modular multiplier of each of the butterfly operator circuits is configured, after performing NTT, to multiply polynomial coefficients in NTT domain.

7. The circuit of claim 1, wherein the shift registers include:

first, second, third, and fourth shift registers situated to respective output coefficients.

8. The circuit of claim 7, wherein the depth of the first, second, third, and fourth shift registers is four, five, six, and seven, respectively.

9. The circuit of claim 7, further comprising:

a first multiplexer configured to provide, based on a select control of the first multiplexer, contents of the first, second, third, and fourth shift registers in consecutive, respective clock cycles.

10. A system comprising:

a memory including polynomial coefficients stored thereon;

butterfly operator circuits configured to receive the polynomial coefficients and generate, after iterations of operating on the polynomial coefficients, transformed coefficients as outputs, a first subset of the butterfly operator circuits situated in series with each other and in parallel with a second subset of the butterfly operator circuits;

first, second, third, and fourth serial-in and parallel-out shift registers with different depths coupled between the butterfly operator circuits and the memory;

a first multiplexer configured to provide, based on a select control of the first multiplexer, contents of the first, second, third, and fourth shift registers in consecutive, respective clock cycles; and a controller coupled to the memory, the controller configured to control which coefficients are provided to the butterfly operator circuits and which addresses of the memory store the outputs, including the transformed coefficients.

11. The system of claim 10, wherein:

the system is configured to perform number theoretic transform (NTT);

the first, second, third, and fourth shift registers are situated to receive the polynomial coefficients; and the controller is configured to read from the memory addresses in non-sequential order and write to the memory addresses in sequential order.

12. The system of claim 10, wherein:

the system is configured to perform INTT;

the first, second, third, and fourth shift registers are situated to receive the outputs of the butterfly operator circuits; and the controller is configured to read from the memory addresses in sequential order and write to the memory addresses in non-sequential order.

13. A method for number theoretic transform (NTT) or inverse NTT (INTT) comprising:

storing, at a memory, polynomial coefficients;

controlling, by a controller coupled to the memory, which of the polynomial coefficients are read from the memory and provided to butterfly operator circuits;

receiving, by butterfly operator circuits, the polynomial coefficients, a first subset of the butterfly operator circuits situated in series with each other and in parallel with a second subset of the butterfly operator circuits;

generating, after iterations of operating on the polynomial coefficients by the butterfly operator circuits, transformed coefficients as outputs;

controlling, by the controller, which addresses of the memory are written to and store the outputs, including the transformed coefficients;

receiving, by serial-in parallel-out shift registers that each has a different depth, respective output coefficients or polynomial coefficients; and providing, by a first multiplexer and based on a select control of the first multiplexer, contents of the shift registers in consecutive, respective clock cycles.

14. The method of claim 13, wherein the controller (i) either reads from or writes to the memory addresses in sequential order and (ii) either writes to or reads from the memory addresses in a non-sequential order.

15. The method of claim 14, wherein the non-sequential order includes, in each two stages of NTT or INTT, writing to or reading from every sixteenth address modulo sixty-four until an address is repeated.

16. The method of claim 13, wherein:

the method is for performing NTT; and the controller reads from the memory addresses in non-sequential order and writes to the memory addresses in sequential order.

17. The method of claim 13, wherein:

the method is for performing INTT; and the controller reads from the memory addresses in sequential order and writes to the memory addresses in non-sequential order.

18. The method of claim 13, further comprising:

multiplying, by a modular multiplier of each of the butterfly operator circuits and after performing NTT, polynomial coefficients in NTT domain.

19. The method of claim 13, wherein the shift registers include first, second, third, and fourth shift registers that have depth of four, five, six, and seven, respectively.

* * * * *